US010136325B2

(12) United States Patent
Shi

(10) Patent No.: US 10,136,325 B2
(45) Date of Patent: Nov. 20, 2018

(54) METHOD FOR IMPLEMENTING ACCESS STRATUM SECURITY, USER EQUIPMENT, AND SMALL RADIO ACCESS NETWORK NODE

(71) Applicant: ZTE CORPORATION, Guangdong (CN)

(72) Inventor: Xiaojuan Shi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/744,733

(22) PCT Filed: Mar. 18, 2016

(86) PCT No.: PCT/CN2016/076741
§ 371 (c)(1),
(2) Date: Jan. 12, 2018

(87) PCT Pub. No.: WO2016/177143
PCT Pub. Date: Nov. 10, 2016

(65) Prior Publication Data
US 2018/0213403 A1 Jul. 26, 2018

(30) Foreign Application Priority Data
Jul. 20, 2015 (CN) .......................... 2015 1 0429851

(51) Int. Cl.
*H04W 12/08* (2009.01)
*H04W 12/04* (2009.01)
(Continued)

(52) U.S. Cl.
CPC .......... *H04W 12/08* (2013.01); *H04W 12/02* (2013.01); *H04W 12/04* (2013.01); *H04W 12/06* (2013.01); *H04W 84/045* (2013.01)

(58) Field of Classification Search
CPC ............... H04W 84/045; H04W 36/04; H04W 36/0061; H04W 36/0083; H04W 36/08;
(Continued)

(56) References Cited

U.S. PATENT DOCUMENTS

2013/0072192 A1* 3/2013 Xu .................. H04W 16/02
455/436
2014/0349659 A1* 11/2014 Ishii ..................... H04W 76/10
455/444
(Continued)

FOREIGN PATENT DOCUMENTS

CN          103929740 A       7/2014
WO          2014112262 A1     7/2014
(Continued)

OTHER PUBLICATIONS

International Search Report dated Jun. 13, 2016 for International Application No. PPCT/CN2016/076741, 7 pages.
(Continued)

*Primary Examiner* — Nimesh Patel
(74) *Attorney, Agent, or Firm* — Knobbe Martens Olson & Bear, LLP

(57) ABSTRACT

A method for implementing access stratum security is provided. The method includes: performing end-to-end user plane access stratum security between a UE and a gateway node; and performing end-to-end control plane access stratum security between the UE and an initial access node when the UE only has a micro communication path; when the UE has the micro communication path and a macro communication path, performing end-to-end control plane access stratum security between the UE and a macro base station in the macro communication path. The micro communication path is a communication path in which the UE accesses a small radio access node via a radio access link and then accesses a core network finally. The macro communication (Continued)

path is a communication path in which the UE accesses the macro base station via the radio access link and then accesses the core network finally.

18 Claims, 11 Drawing Sheets

(51) Int. Cl.
*H04W 12/06* (2009.01)
*H04W 12/02* (2009.01)
*H04W 84/04* (2009.01)

(58) Field of Classification Search
CPC ..... H04W 24/10; H04W 4/02; H04W 52/245; H04W 36/165; H04W 36/0072; H04W 52/241; H04W 52/243; H04W 64/00; H04W 88/02; H04W 16/24; H04W 76/15; H04W 16/32; H04W 36/32; H04W 36/14; H04W 36/30; H04W 28/08; H04W 36/28; H04W 12/08; H04W 48/08; H04W 12/04; H04W 36/00
See application file for complete search history.

(56) References Cited

U.S. PATENT DOCUMENTS

| | | |
|---|---|---|
| 2015/0365822 A1 | 12/2015 | Sharma |
| 2016/0191471 A1* | 6/2016 | Ryoo .................. H04W 12/04 455/411 |
| 2016/0277987 A1* | 9/2016 | Chen ................... H04L 5/0085 |

FOREIGN PATENT DOCUMENTS

| | | |
|---|---|---|
| WO | 2015036047 A1 | 3/2015 |
| WO | 2015097980 A1 | 7/2015 |

OTHER PUBLICATIONS

Written Opinion of the International Searching Authority dated Jun. 13, 2016 for International Application No. PCT/CN2016/076741, 4 pages.

ZTE, "R3-150234, Deployment Scenarios and Mobility for Small Cell Enhancement", 3GPP TSG-RAN WG3 Meeting #87, vol./No./, Feb. 13, 2015.

Huawei et al., "R3-150577, History discussion on Mobility Anchor," 3GPP TSG-RAN3 Meeting #87bis, Tenerife—Santa Cruz, Spain, Apr. 20-24, 2015.

* cited by examiner

METHOD FOR IMPLEMENTING ACCESS STRATUM SECURITY, USER EQUIPMENT, AND SMALL RADIO ACCESS NETWORK NODE

CROSS REFERENCE TO RELATED APPLICATIONS

This application is the U.S. National Phase Application under 35 U.S.C. § 371 of International Application No. PCT/CN2016/076741 filed Mar. 18, 2016, designating the U.S. and published as WO 2016/177143 A1 on Oct. 11, 2016, which claims the benefit of Chinese Patent Application No. 201510429851.2, filed on Jul. 20, 2015, which are hereby incorporated by reference in their entirety.

TECHNICAL FIELD

The present application relates, but is not limited, to the mobile communication technology, and in particular relates to a method for implementing access stratum security, a user equipment and a small radio access network node.

BACKGROUND

A cellular radio mobile communication system appeared in the 1980s, and is used for meeting requirements for human voice communication at the beginning. On the basis of voice services, the cellular radio mobile communication system is gradually developed to meet requirements for the basic data communication of the human later. A conventional cellular radio communication system is deployed and operated by a radio network operator. Network construction is carefully planned by the operator. FIG. 1 is a schematic diagram of a network topology of a conventional cellular radio access network. As shown in FIG. 1, the siting of each macro base station (MNB, Macro (e) NB) is planned by the operator, and each macro base station may have several hundred meters or even several kilometers of radio coverage, thereby achieving nearly continuous seamless coverage within the operator's operation area.

With the advent of the mobile internet era, new demands for mobile applications, especially mobile applications requiring high-quality, high-speed, low-latency, boom. According to industry forecasts, on the one hand, radio mobile services will have thousands of times of growth in the next 10 years, and traditional radio communication systems that realize long-range macro coverage cannot meet such a huge capacity demand. On the other hand, according to the statistics of user communication behaviors and habits, it is found that most high-data-flow mobile services are concentrated in indoor environments and hot spots, such as shopping malls, schools, users' homes, large-scale shows and public venues, etc. However, indoor environments and hot spots are distributed widely and dispersedly, have small area and mass users. That is, the conventional cellular radio network having the characteristics of wide coverage, uniform coverage, and constant coverage cannot well adapt to the situation of centralized services in a small area. In addition, under the conventional cellular radio network, the cellular radio signal in the indoor environment is inferior to that in the outdoor environment due to various reasons, such as the blocking of a building and the like, resulting in failure of the conventional cellular radio network to meet the demand of future large data capacity in the indoor environment.

In order to solve the above problem, a small radio access network node (SRAN-node, abbreviated to a small node hereinafter) is proposed. Conceptually, the SRAN-node refers to a radio access network node that has a lower transmitting power and a smaller coverage area as compared with the conventional macro base station. Therefore, the SRAN-node may also be referred to as a low-power node (LPN), such as a Pico Node, a Femto/Home (e)NB, a relay, and any other possible access network apparatus having a transmitting power far lower than the conventional macro base station and capable of accessing the network through a radio communication link.

In order to meet huge capacity of future radio communication system, especially to meet a requirement of centralized large data volume in a certain area, those skilled in the art predict that the network capacity may be increased by increasing the deployment density of the SRAN-node in the certain area so as to meet user's requirements. Such a network densely deployed in the certain area is called as an Ultra Dense Network (UDN). FIG. 2 is a schematic diagram of deploying the UDN in a certain area of a conventional cellular radio access network. As shown in FIG. 2, each of a mansion 200, a stadium 210 and a hotspot 230 is deployed with a large number of SRAN-nodes.

The UDN can improve the network capacity. However, it is not expected to increase Capital Expenditure (CAPEX) and Operating Expense (OPEX) of the future network while increasing the network capacity. That is to say, the deployment of UDN needs to reduce man-made planning, optimization and management. The UDN should be deployed flexibly and rapidly in the indoor or outdoor hot areas or large traffic areas according to the network topology, network load, service requirements, and so on, and can be self-configured, self-optimized and self-healing. To achieve the above, those skilled in the art generally believes that only a part or a few of SRAN-nodes in the UDN can be accessed to a core network equipment through wired backhaul (such as optical fiber, cable, etc.); while other SRAN-nodes need to support radio backhaul. By taking advantage of the property of dense short-distance deployment among the SRAN-nodes, the interconnection and intercommunication among the SRAN-nodes are achieved through radio backhaul links among the SRAN-nodes, and the SRAN-nodes are accessed to the core network equipment through the radio backhaul link by passing the wireless connection (one hop) between two SRAN-nodes, or passing wireless connections (multiple hops) between multiple SRAN-nodes in turn. In this way, in the UDN network, communication data of a user equipment (UE) probably need to be transmitted over two or even more air interface transmissions. In the case that there are two air interfaces, the two air interfaces include an air interface radio access link (RAL) between the UE and the SRAN-node (denoted as SRAN-node-x) accessed by the UE and an air interface radio backhaul link between the SRAN-node-x and the SRAN-node having wired backhaul (denoted as SRAN-node-z). In the case that there are more than two air interfaces, taking three air interfaces as an example, the air interfaces include the RAL, an air interface radio backhaul link between the SRAN-node-x and an intermediate node (denoted as SRAN-node-y), and an air interface radio backhaul link between the SRAN-node-y and the SRAN-node-z.

In the future, a large number of SRAN-nodes will be densely deployed in the UDN, but only a few SRAN-nodes have a wired backhauls, causing the communication data of the UE likely to be transmitted through two or even more air interfaces. A technical problem required to be solved urgently is to ensure the security of such mobile communication system, so as to ensure the security the communication data of the UE when being transmitted through two or even more air interfaces. Currently, there is no specific technical method.

SUMMARY

The following is a summary of the topic described in detail in this disclosure. This summary is not intended to limit the scope of the claims.

Embodiments of the present disclosure provide a method for implementing access stratum security, a user equipment, and a small radio access node, which can ensure the security when communication data of the UE is transmitted through two or more air interfaces, improve the mobility performance of the UE at the same time, and ensure the transmission continuity of user plane data of the UE.

An embodiment of the present disclosure provides a method for implementing access stratum security including:

performing end-to-end user plane access stratum security between a user equipment (UE) and a gateway node; and performing end-to-end control plane access stratum security between the UE and an initial access node when the UE only has a micro communication path; when the UE has the micro communication path and a macro communication path, performing the end-to-end control plane access stratum security between the UE and a macro base station in the macro communication path;

the micro communication path is a communication path in which the UE accesses a small radio access node via a radio access link and then accesses a core network finally; and the macro communication path is a communication path in which the UE accesses the macro base station via the radio access link and then accesses the core network finally.

In an exemplary embodiment, in the micro communication path, the UE communicates with the core network through at least two radio air interfaces. The micro communication path at least includes the UE, the initial access node and the gateway node. When the UE communicates with the core network through more than two radio air interfaces, the micro communication path further includes at least one intermediate routing node.

In an exemplary embodiment, a radio access air interface Uu is used between the UE and the initial access node. A radio backhaul interface Ub is used between the initial access node and the gateway node.

In an exemplary embodiment, a radio backhaul interface Ub is used not only between the intermediate routing node and the initial access node but also between the intermediate routing node and the gateway node. When there are two or more intermediate routing nodes, the radio backhaul interface Ub is used between the intermediate routing nodes.

In an exemplary embodiment, the initial access node is the small radio access node accessed by the UE through the radio access link. The gateway node is the small radio access node capable of accessing the core network through a wired interface. The intermediate routing node is the small radio access node for providing relay transmission, so as to realize the communication between the initial access node and the gateway node and finally realize the communication between the UE accessing the initial access node and the core network.

In an exemplary embodiment, the performing end-to-end user plane access stratum security between a user equipment (UE) and a gateway node includes: performing end-to-end user plane encryption and user plane integrity protection between the UE and the gateway node. The performing end-to-end control plane access stratum security between the UE and an initial access node comprises performing end-to-end control plane encryption and control plane integrity protection between the UE and the initial access node, and the performing end-to-end control plane access stratum security between the UE and a macro base station comprises performing the end-to-end control plane encryption and control plane integrity protection between the UE and the macro base station.

In an exemplary embodiment, the performing end-to-end user plane access stratum security between a user equipment (UE) and a gateway node includes: performing the end-to-end user plane access stratum security between a packet data convergence protocol security (PDCP-s) layer of the UE and the PDCP-s layer of the gateway node.

In an exemplary embodiment, the gateway node, at the side of a radio backhaul interface Ub, and the UE include following layers from bottom to top respectively: a physical layer L1, a media access control (MAC) layer, a radio link control (RLC) layer, a packet data convergence protocol thinned (PDCP-t) layer and the packet data convergence protocol security (PDCP-s) layer. Each of the initial access node and the intermediate routing node includes following layers from bottom to top: L1, MAC and RLC, or includes following layers from bottom to top: L1, MAC, RLC and PDCP-t. The PDCP-s and the PDCP-t of the UE form a PDCP layer when being incorporated into one protocol layer. The PDCP-s and the PDCP-t of the gateway node form the PDCP layer when being incorporated into one protocol layer.

In an exemplary embodiment, the performing end-to-end user plane encryption and user plane integrity protection between the UE and the gateway node includes:

performing, in the PDCP-s of the UE, encryption and integrity protection on user plane data of upper layers of the UE before the user plane data is transmitted to the air interface, and performing, in the PDCP-s of the gateway node, decryption and integrity verification on the user plane data by the gateway node after the user plane data is transmitted to the gateway node; and if user plane data required to be transmitted to the UE is obtained from the core network by the gateway node, performing, in the PDCP-s of the gateway node, encryption and integrity protection on the user plane data required to be transmitted to the UE before the user plane data required to be transmitted to the UE is transmitted to the air interface; and performing, in the PDCP-s of the UE, decryption and integrity verification on the user plane data by the UE, after the user plane data is transmitted to the UE.

In an exemplary embodiment, the PDCP-s layer is configured to implement: header compression and decompression, and secure operations. The secure operations include: encryption, decryption, integrity protection and integrity verification.

In an exemplary embodiment, the performing end-to-end control plane access stratum security between the UE and the initial access node includes performing the end-to-end control plane access stratum security between a packet data convergence protocol (PDCP) layer of the UE and the PDCP of the initial access node. The performing end-to-end control plane access stratum security between the UE and a macro base station includes performing the end-to-end control plane access stratum security between the PDCP of the UE and the PDCP of the macro base station.

In an exemplary embodiment, the initial access node, at the side of a radio access air interface Uu, and the UE include following layers from bottom to top respectively: a physical layer L1, a media access control (MAC) layer, a radio link control (RLC) layer and a packet data convergence protocol (PDCP) layer. At the side of the Ub interface, each of the initial access node, the intermediate routing node and the gateway node includes following layers from bottom to top: L1, MAC and RLC, or includes L1, MAC, RLC and a packet data convergence protocol thinned (PDCP-t) layer.

In an exemplary embodiment, the performing end-to-end control plane encryption and control plane integrity protection between the UE and the initial access node or between the UE and the macro base station includes:

performing, in the PDCP layer of the UE, encryption and integrity protection on a uplink radio resource control layer (RRC) signaling of the UE before the uplink RRC signaling is transmitted to the air interface; and performing decryption and integrity verification on the uplink RRC signaling by the initial access node or the macro base station after the RRC signaling is received; and before a downlink RRC signaling to be transmitted to the UE from the initial access node or the macro base station is transmitted to the air interface, performing, by the initial access node or the macro base station, encryption and integrity protection on the downlink RRC signaling in the PDCP of the initial access node or the macro base station; and performing decryption and integrity verification on the downlink RRC signaling by the UE after the downlink RRC signaling is received.

In an exemplary embodiment, the method further includes: generating, between the UE and the gateway node, a user plane encryption key $K_{UPenc}$ and a user plane integrity protection key $K_{UPint}$ required for performing the end-to-end user plane encryption and user plane integrity protection between the UE and the gateway node;

when the UE only has the micro communication path, the generating, between the UE and the gateway node, a user plane encryption key $K_{UPenc}$ and a user plane integrity protection key $K_{UPint}$ required for performing the end-to-end user plane encryption and user plane integrity protection between the UE and the gateway node includes:

generating, by the UE and the gateway node, the user plane encryption key $K_{UPenc}$ and the user plane integrity protection key $K_{UPint}$ based on an access stratum security root key $K_{eNB}$;

the $K_{eNB}$ of the UE is generated after performing an authentication and key agreement (AKA) process and a non-access stratum (NAS) security process between the UE and the core network; the $K_{eNB}$ of the gateway node is received from the core network after performing the AKA process and the NAS security process between the UE and the core network;

when the UE has the micro communication path and the macro communication path, the generating, between the UE and the gateway node, a user plane encryption key $K_{UPenc}$ and a user plane integrity protection key $K_{UPint}$ required for performing the end-to-end user plane encryption and user plane integrity protection between the UE and the gateway node includes:

generating, by the UE and the macro base station in the macro communication path, the user plane encryption key $K_{UPenc}$ and the user plane integrity protection key $K_{UPint}$ based on the $K_{eNB}$; and transmitting, by the macro base station, the generated plane encryption key $K_{UPenc}$ and the user plane integrity protection key $K_{UPint}$ to the gateway node; or generating, by the UE and the gateway node, the user plane encryption key $K_{UPenc}$ and the user plane integrity protection key $K_{UPint}$ based on the $K_{eNB}$, the $K_{eNB}$ of the gateway node is received from the macro base station;

the $K_{eNB}$ of the UE is generated after performing the authentication and key agreement (AKA) process and the non-access stratum (NAS) security process between the UE and the core network; the $K_{eNB}$ of the macro base station is received from the core network after performing the AKA process and the NAS security process between the UE and the core network.

In an exemplary embodiment, the method further includes the followings when the UE only has the micro communication path: generating a control plane encryption key $K_{RRCenc}$ and a control plane integrity protection key $K_{RRCint}$ required for performing the end-to-end control plane encryption and control plane integrity protection between the UE and the initial access node, the generating a control plane encryption key $K_{RRCenc}$ and a control plane integrity protection key $K_{RRCint}$ required for performing the end-to-end control plane encryption and control plane integrity protection between the UE and the initial access node, includes one of the followings:

generating, by the UE and the gateway node, the control plane encryption key $K_{RRCenc}$ and the control plane integrity protection key $K_{RRCint}$ based on an access stratum security root key $K_{eNB}$; and transmitting, by the gateway node, the generated control plane encryption key $K_{RRCenc}$ and control plane integrity protection key $K_{RRCint}$ to the initial access node; and generating, by the UE and the gateway node, an access stratum control plane security root key $K_{eNB*}$ based on the $K_{eNB}$, a downlink E-UTRA Absolute Radio Frequency Channel Number (EARFCN-DL) of a cell of the initial access node and a physical cell identity (PCI), transmitting the generated $K_{eNB*}$ by the gateway node to the initial access node, and generating, by the UE and the gateway node, the control plane encryption key $K_{RRCenc}$ and the control plane integrity protection key $K_{RRCint}$ based on the $K_{eNB*}$;

the method further comprises the followings when the UE has the micro communication path and the macro communication path: generating the control plane encryption key $K_{RRCenc}$ and the control plane integrity protection key $K_{RRCint}$ required for performing the end-to-end control plane encryption and control plane integrity protection between the UE and the macro base station, the generating the control plane encryption key $K_{RRCenc}$ and the control plane integrity protection key $K_{RRCint}$ required for performing the end-to-end control plane encryption and control plane integrity protection between the UE and the macro base station, includes:

generating, by the UE and the macro base station, the control plane encryption key $K_{RRCenc}$ and the control plane integrity protection key $K_{RRCint}$ based on the access stratum security root key $K_{eNB}$;

the $K_{eNB}$ of the UE is generated after performing the authentication and key agreement (AKA) process and the non-access stratum (NAS) security process between the UE and the core network; the $K_{eNB}$ of the gateway node or the macro base station is received from the core network after performing the AKA process and the NAS security process between the UE and the core network.

In an exemplary embodiment, keys of the user plane and keys of the control plane are individually updated respectively.

An embodiment of the present disclosure further provides a UE. The UE at least includes: a first process module, a first user plane process module and a first control plane process module.

The first process module is configured to implement an authentication and key agreement (AKA) process and a non-access stratum (NAS) security process between the UE and a core network.

The first user plane process module is configured to perform end-to-end user plane access stratum security between the UE and a gateway node.

The first control plane process module is configured to: perform end-to-end control plane access stratum security between the UE and an initial access node when the UE only has a micro communication path; perform the end-to-end control plane access stratum security between the UE and a macro base station in a macro communication path when the UE has the micro communication path and the macro communication path.

The micro communication path is a communication path in which the UE accesses a small radio access node via a radio access link and then accesses the core network finally; and the macro communication path is a communication path in which the UE accesses the macro base station via the radio access link and then accesses the core network finally.

In an exemplary embodiment, the first user plane process module is further configured to perform end-to-end user plane encryption and user plane integrity protection between the UE and the gateway node. The first control plane process module is further configured to perform end-to-end control plane encryption and control plane integrity protection between the UE and the initial access node or between the UE and the macro base station.

In an exemplary embodiment, in the micro communication path of the UE, the UE communicates with the core network through at least two radio air interfaces. The micro communication path at least includes the UE, the initial access node and the gateway node. When the UE communicates with the core network through more than two radio air interfaces, the micro communication path further includes at least one intermediate routing node.

In an exemplary embodiment, the initial access node is the small radio access node accessed by the UE through the radio access link. The gateway node is the small radio access node capable of accessing the core network through a wired interface. The intermediate routing node is the small radio access node for providing relay transmission, so as to realize the communication between the initial access node and the gateway node and finally realize the communication between the UE accessing the initial access node and the core network.

In an exemplary embodiment, the first user plane process module is further configured to perform the end-to-end user plane access stratum security between the UE and the gateway node between a packet data convergence protocol security (PDCP-s) layer of the UE and the PDCP-s layer of the gateway node. The first control plane process module is further configured to: perform the end-to-end control plane access stratum security between the UE and the initial access node between the packet data convergence protocol (PDCP) layer of the UE and the PDCP layer of the initial access node; or perform the end-to-end control plane access stratum security between the UE and the macro base station between the PDCP layer of the UE and the PDCP layer of the macro base station.

In an exemplary embodiment, the first user plane process module is further configured to:

perform, in a packet data convergence protocol security (PDCP-s) layer of the UE, encryption and integrity protection on user plane data of upper layers of the UE before the user plane data of upper layers of the UE is transmitted to the air interface, the gateway node performs decryption and integrity verification on the user plane data in the PDCP-s layer of the gateway node after the user plane data is transmitted to the gateway node; and perform, in the PDCP-s layer of the UE, decryption and integrity verification on the user plane data transmitted from the gateway node and received via the air interface.

In an exemplary embodiment, the first control plane process module is further configured to:

perform, in a packet data convergence protocol (PDCP) layer of the UE, encryption and integrity protection on a uplink radio resource control (RRC) layer signaling of the UE before the uplink RRC signaling is transmitted to the air interface, the initial access node or the macro base station performs decryption and integrity verification on the RRC signaling after the RRC signaling is received; and perform decryption and integrity verification on downlink RRC signaling transmitted from the initial access node or the macro base station through the air interface after the UE receives the downlink RRC signaling.

An embodiment of the present disclosure further provides a small radio access node capable of accessing a core network through a wired interface. The small radio access node at least includes: a second user plane process module, configured to perform end-to-end user plane access stratum security between a UE and the small radio access node. The end-to-end user plane access stratum security includes end-to-end user plane encryption and user plane integrity protection.

In an exemplary embodiment, when the UE communicates with the core network through two radio air interfaces, the small radio access node communicates with an initial access node through a radio backhaul interface. When the UE communicates with the core network through more than two radio air interfaces, the small radio access node communicates with an intermediate routing node through the radio backhaul interface, and the intermediate routing node communicates with the initial access node through the radio backhaul interface. When there are two or more intermediate routing nodes, the intermediate routing nodes communicate with each other through the radio backhaul interface. The initial access node is the small radio access node accessed by the UE through radio access link. The intermediate routing node is the small radio access node for providing relay transmission, so as to realize the communication between the initial access node and the small radio access node and finally realize the communication between the UE accessing the initial access node and the core network.

In an exemplary embodiment, the end-to-end user plane access stratum security is performed between the packet data convergence protocol security PDCP-s layer of the small radio access node and the PDCP-s layer of the UE.

In an exemplary embodiment, the second user plane process module is configured to:

perform, in the PDCP-s layer of the small radio access node, decryption and integrity verification on user plane data transmitted from the UE and received via the air interface; and acquire user plane data to be transmitted to the UE from the core network, and before the user plane data to be transmitted to the UE is transmitted to the air interface, perform, in the PDCP-s layer of the small radio access node, encryption and integrity protection on the user plane data to be transmitted to the UE.

In an exemplary embodiment, the small radio access node further includes a user plane key generation module configured to:

generate a user plane encryption key $K_{UPenc}$ and a user plane integrity protection key $K_{UPint}$ required for performing the end-to-end user plane encryption and user plane integrity protection, before the second user plane process module performs the end-to-end user plane encryption and user plane integrity protection between the UE and the small radio access node.

In an exemplary embodiment, the user plane key generation module is configured to:

generate the user plane encryption key $K_{UPenc}$ and the user plane integrity protection key $K_{UPint}$ based on an access stratum security root key $K_{eNB}$; or receive the user plane encryption key $K_{UPenc}$ and the user plane integrity protection key $K_{UPint}$ from a macro base station, the $K_{eNB}$ is transmitted to the small radio access node by the core network or the macro base station;

the macro base station is another base station accessed by the UE through the radio access link besides the initial access node.

An embodiment of the present disclosure further provides a small radio access node accessed by a user equipment UE through a radio access link. The small radio access node at least includes: a second control plane process module, configured to perform end-to-end control plane access stratum security between the UE and the small radio access node. The end-to-end control plane access stratum security includes end-to-end control plane encryption and control plane integrity protection.

In an exemplary embodiment, the end-to-end control plane access stratum security is performed between a packet data convergence protocol (PDCP) layer of the small radio access node and the PDCP layer of the UE.

In an exemplary embodiment, the second control plane process module is configured to:

perform decryption and integrity verification on radio resource control (RRC) signaling after receiving the RRC signaling; and perform, in the PDCP layer of the small radio access node, encryption and integrity protection on downlink RRC signaling to be transmitted to the UE, and then transmit the downlink RRC signaling to the air interface.

In an exemplary embodiment, the small radio access node further includes a control plane key generation module configured to:

generate a control plane encryption key $K_{RRCenc}$ and a control plane integrity protection key $K_{RRCint}$ required for performing the end-to-end control plane encryption and control plane integrity protection, before the second control plane process module performs the end-to-end control plane encryption and control plane integrity protection between the UE and the small radio access node.

In an exemplary embodiment, the control plane key generation module is configured to:

receive the control plane encryption key $K_{RRCenc}$ and the control plane integrity protection key $K_{RRCint}$ from a gateway node, or generate the control plane encryption key $K_{RRCenc}$ and the control plane integrity protection key $K_{RRCint}$ based on an access stratum control plane security root key $K_{eNB^*}$ from the gateway node.

An embodiment of the present disclosure further provides a small radio access node including any combination of the above two small radio access nodes.

In addition, an embodiment of the present disclosure further provides a computer readable storage medium. The medium stores computer executable instructions. When executed, the computer executable instructions perform the above method for implementing access stratum security.

The technical solution of the present application includes: performing end-to-end user plane access stratum security between a user equipment (UE) and a gateway node; and performing end-to-end control plane access stratum security between the UE and an initial access node when the UE only has a micro communication path; when the UE has the micro communication path and a macro communication path, performing end-to-end control plane access stratum security between the UE and a macro base station in the macro communication path. The micro communication path is a communication path in which the UE accesses a small radio access node via a radio access link and then accesses a core network finally; and the macro communication path is a communication path in which the UE accesses the macro base station via the radio access link and then accesses the core network finally. On the one hand, no matter how many intermediate routing nodes are in the communication path of the UE, the user plane security is end-to-end performed only between the UE and the gateway node, which greatly ensures user plane security and avoids the safe leakage risk due to multiple air interfaces (namely multiple intermediate routing nodes). Since the control plane security is end-to-end performed between the UE and the initial access node, the delay in control plane security procedure is reduced while ensuring the control plane security. On the other hand, the user plane security is end-to-end performed only between the UE and the gateway node, such that when the UE moves between different SRAN-nodes, as long as the communication paths of the UE are finally connected to the core network through the same node, the user plane security is unvaried, thereby improving the mobility performance of the UE. In addition, the user plane security is end-to-end performed only between the UE and the gateway node, so no matter how the intermediate nodes in the communication path of the UE are changed, the user plane security will not be changed, thereby ensuring the transmission continuity of user plane data of the UE.

Other features and advantages of the disclosure will be set forth in the description, and will be obvious partly based on the description, or may be learned by practice of the application. The objects and other advantages of the disclosure may be realized and attained by the structure specifically pointed out in the description and claims as well as the accompanying drawings.

Other aspects will become apparent upon reading and understanding the drawings and detailed description.

BRIEF DESCRIPTION OF DRAWINGS

The accompanying drawings described herein are used to provide a further understanding of the present disclosure and form a part of the present disclosure. The exemplarily embodiments and the descriptions thereof are used to explain the disclosure and do not constitute improper limitations to the present disclosure. In the drawings.

DETAILED DESCRIPTION

Hereinafter, embodiments of the present disclosure will be described in detail with reference to the accompanying drawings. It should be noted that, the embodiments in the present disclosure and the features in the embodiments may be arbitrarily combined with each other.

Figure 3:
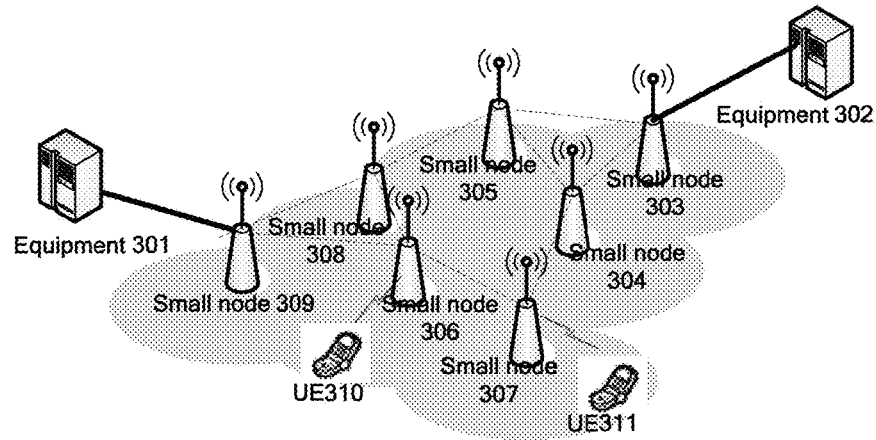
FIG. 3 is a schematic diagram of a deployment of ultra-dense network in a certain area in the future.

In order to meet the expected thousands of times of service growth in the next 10 years, UDNs will be widely deployed to undertake a large amount of service traffic. The UDNs may be deployed in indoor or outdoor hot spots, or in any area with high traffic demand FIG. 3 is a schematic diagram of a deployment of ultra-dense network in a certain area in the future. Considering the infrastructure limitations of the actual deployment of network, such as the limited number of wired network ports in the area shown, and in order to achieve the flexible and rapid deployment of the network without increasing the CAPEX and OPEX of the deployment and operation of the network, in 7 SRAN-nodes shown in FIG. 3, only positions where the small node 303 and the small node 309 are deployed are provided with a wired network port. That is, the small node 303 and the small node 309 may be connected to the core network equipment and the operation administration and maintenance (OAM) equipment through the wired backhaul illustrated by a black bold solid line in FIG. 3. For example, the small node 303 may be connected to an equipment 302 and the small node 309 may be connected to an equipment 301. In FIG. 3, none of positions where the other 5 small nodes are deployed is provided with the wired network port. Therefore, these 5 small nodes can only be connected to the small node 303 or small node 309 through radio backhaul links (illustrated by dotted lines in FIG. 3) between these small nodes and other nearby small nodes, e.g., through one-hop radio backhaul link or a multi-hop radio backhaul link, and finally are connected, via the wired port of the small node 303 or the small node 309, to the core network equipment and the OAM equipment, etc. Accordingly, in the network deployment shown in FIG. 3, the communication data of a lot of UEs is inevitably to be transmitted through two or more air interface transmissions. For example, taking the UE 310 in FIG. 3 as an example, the communication data between the UE 310 and the equipment 301 needs to be transmitted through two air interfaces. That is, the communication between the UE 310 and the equipment 301 is achieved through the radio access link between the UE301 and the small node 306 (illustrated by a lightning line in FIG. 3) and the radio backhaul link between the small node 306 and the small node 309. As another example, the communication data between the UE 311 and the equipment 301 in FIG. 3 needs to be transmitted through three air interfaces. That is, the communication between the UE 311 and the equipment 301 is achieved through the radio access link between the UE 311 and the small node 307, the radio backhaul link between the small node 307 and the small node 306 and the radio backhaul link between the small node 306 and the small node 309.

Figure 4:
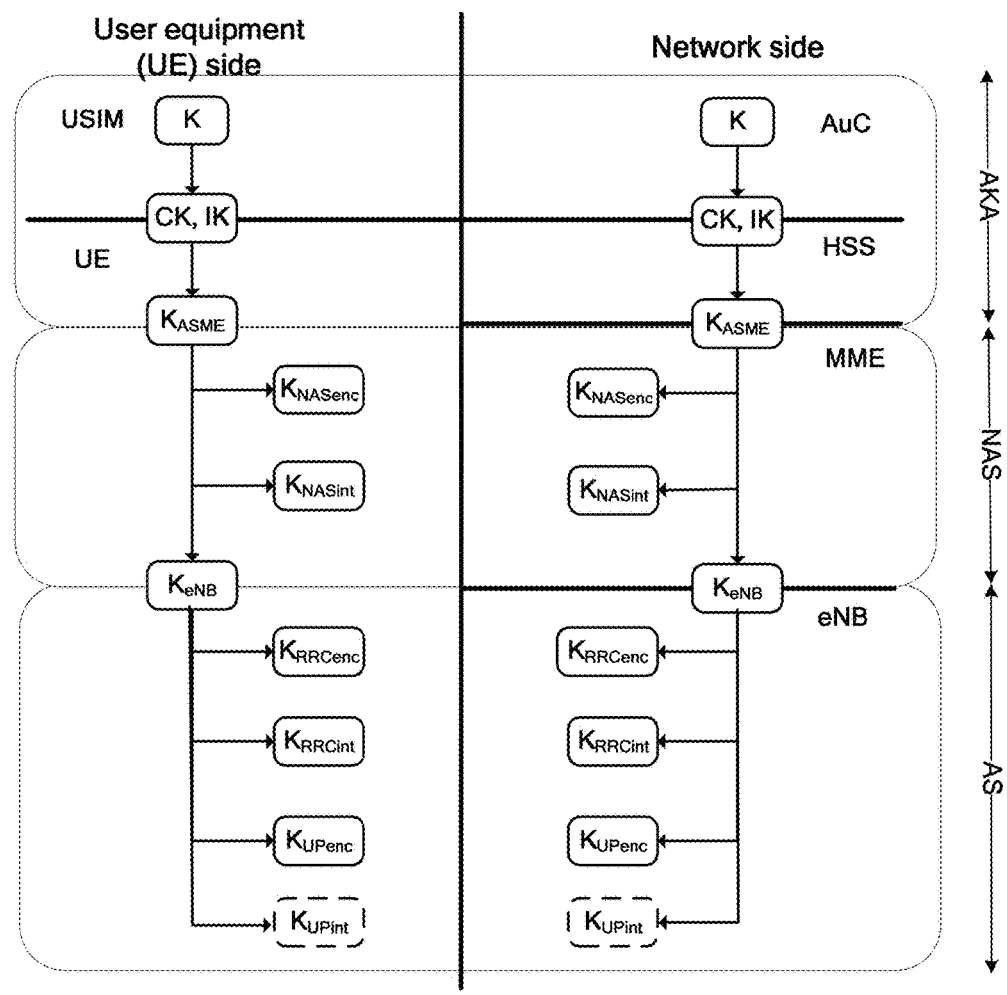
FIG. 4 is a schematic diagram showing security levels of a Long Term Evolution (LTE) system in the related art.
Figure 5:
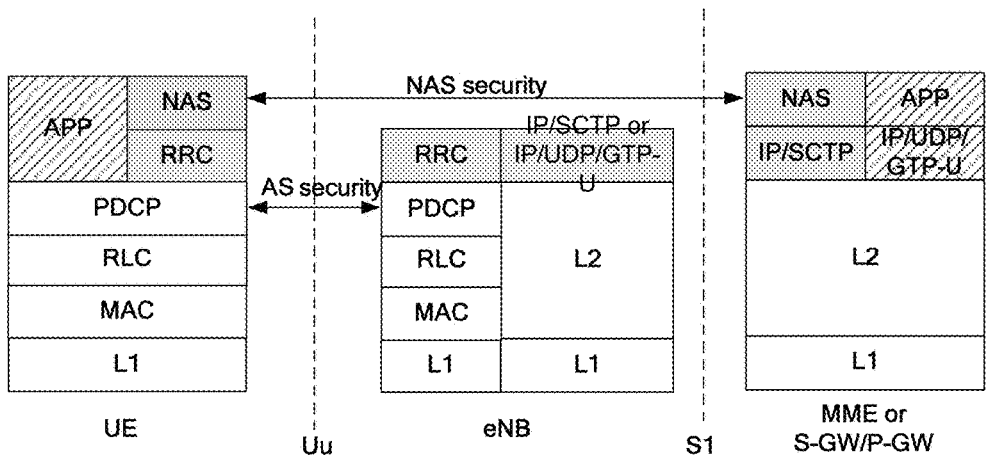
FIG. 5 is an implementation distribution diagram of a LTE system protocol stack corresponding to the security levels diagram shown in FIG. 4.

FIG. 4 is a schematic diagram showing security levels of a LTE system in the related art. FIG. 5 is an implementation distribution diagram of a LTE system protocol stack corresponding to the security levels diagram shown in FIG. 4. In FIG. 5, the shaded section marked with slant lines indicates a control plane and the gray shaded section indicates a user plane. As shown in FIG. 5, both of the control plane protocol stack and the user plane protocol stack are illustrated. For equipments in the core network, such as Mobility Management Entity (MME)/Serving Gateway (S-GW)/Packet Data Network Gateway (P-GW), these equipments may be physically located on the same physical device, while implement different logical functions logically. For example, in the architecture of the protocol stack of the equipment in the core network at the rightmost side of FIG. 5, a control plane protocol stack non-access stratum (NAS) and an internet protocol/stream control transmission protocol (IP/SCTP) are implemented on the MME, while a user plane protocol stack application layer protocol (APP) and the internet protocol (IP)/user datagram protocol (UDP)/GPRS Tunnelling Protocol User Plane (GTP-U) are implemented on the S-GW/P-GW. As shown in FIG. 4, in order to ensure the communication security of the LTE system, the LTE system performs three security operations, namely, an authentication and key agreement (AKA), a non-access stratum security mode command (NAS SMC), an access stratum security mode command (AS SMC).

As shown in FIG. 4, a universal subscriber identity module (USIM) of the UE at the UE side is stored with a security root key K, and an authentication center (AuC) device at the network side is also stored with the same security root key K. In this way, during the AKA process, first, each of the UE and a home subscriber server (HSS) at the network side calculates a cipher key (CK) and an integrity key (IK) according to the above stored security root key K; next, each of the UE and HSS calculates a security management key $K_{ASME}$ according to the generated CK and IK. The security management key $K_{ASME}$ is the root key of a subsequent NAS security and AS security. In the AKA process, in addition to generating the security management key $K_{ASME}$, the UE and the HSS perform an identity authentication between each other to ensure the validity of the equipment of each other.

After the AKA process is completed, a NAS SMC process is performed between a mobility management entity (MME) at the network side and the UE. The specific process includes: each of the UE and the MME derives a NAS integrity key $K_{NAS\ int}$ and a NAS security key $K_{NAS\ enc}$ according to the security management key $K_{ASME}$ generated in the AKA process. Corresponding to the LTE system protocol stack in FIG. 5, the NAS security is implemented between the NAS protocol layer at the UE side and the NAS protocol layer at the MME side trough an end-to-end manner Before the NAS signaling of the MME or the UE is transmitted to the opposite end, the NAS integrity key $K_{NAS\ int}$ and the NAS security key $K_{NAS\ enc}$ are used to perform the integrity protection and encryption on the NAS signaling, so as to ensure the security of the NAS signaling.

In the NAS SMC process, the MME further calculates and generates a root key $K_{eNB}$ of the AS based on the security management key $K_{ASME}$ and an uplink NAS count of the NAS, and informs the eNB accessed by the UE of the root key $K_{eNB}$ of the AS. Next, the AS SMC process may be performed between the eNB and the UE so as to ensure the security of the radio access air interface (Uu interface) between the UE and the eNB. The specific process includes: each of the UE and the eNB derives an integrity key $K_{RRC\ int}$ of the control plane of the Uu interface and a security key $K_{RRC\ enc}$ of the control plane of the Uu interface according to the $K_{eNB}$, and derive a security key $K_{UP\ enc}$ of as the user plane of the Uu interface. In the case that the two communication parties are a replay and an eNB (in the related art, an interface between the relay and the eNB is referred to as a Un interface to be easily distinguished from the Uu interface), an integrity key $K_{UP\ int}$ of the user plane of the air interface Un may also be derived. Corresponding to the LTE system protocol stack in FIG. 5, the AS security is implemented between a packet data convergence protocol (PDCP) layer at the UE side and the PDCP layer at the eNB side through an end-to-end manner A radio resource control (RRC) layer signaling of the UE or the eNB is subjected to integrity protection and encryption in the PDCP layer using the integrity key $K_{RRC\ int}$ and the security key $K_{RRC\ enc}$ of the control plane of the Uu interface, before being transmitted to the opposite end. Before the upper layer NAS signaling and the data of upper layers of the UE and the like are transmitted to the eNB and before the eNB transmits data and signaling from a S1 interface to the UE, such signaling and data are encrypted in the PDCP layer using the security key $K_{UP}$ enc of the user plane of the Uu interface. For the case of the transmission of Un interface, such data and signaling are subjected to integrity protection in the PDCP layer using the security key $K_{UP\ int}$ of the user plane of the Un interface. The security of information transmission over the radio air interface is ensured through the AS security.

Figure 6:
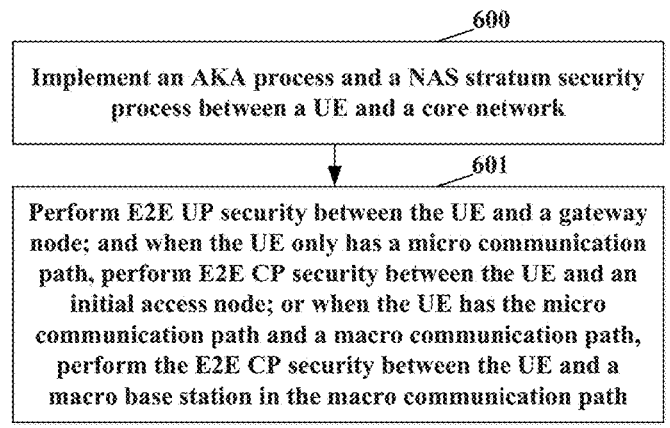
FIG. 6 is a flowchart of a method for implementing access stratum security according to an embodiment of the present disclosure.

FIG. 6 is a flowchart of a method for implementing access stratum security according to an embodiment of the present disclosure. As shown in FIG. 6, the method includes the following steps.

In step 600, an AKA process and a NAS security process are implemented between a UE and a core network. The specific implementation of this step is well known to those skilled in the art, and the specific implementation is not intended to limit the protection scope of the present disclosure, and details are not described herein.

In step 601, end-to-end user plane access stratum security between the UE and a gateway node is performed; and when the UE only has a micro communication path, end-to-end control plane access stratum security between the UE and an initial access node is performed; or when the UE has the micro communication path and a macro communication path, the end-to-end control plane access stratum security between the UE and a macro base station in the macro communication path is performed.

The micro communication path is a communication path in which the UE accesses a small radio access node through a radio access link and then accesses the core network finally. The macro communication path is a communication path in which the UE accesses the macro base station through the radio access link and then accesses the core network finally.

In this step, the process of performing the end-to-end user plane access stratum security between the UE and the gateway node includes performing end-to-end user plane encryption and user plane integrity protection between the UE and the gateway node.

The process of performing the end-to-end control plane access stratum security between the UE and the initial access node or between the UE and the macro base station includes performing end-to-end control plane encryption and control plane integrity protection between the UE and the initial access node or between the UE and the macro base station.

In an exemplary embodiment, in the micro communication path, the UE communicates with the core network through at least two radio air interfaces.

The micro communication path at least includes the UE, the initial access node and the gateway node.

When the UE communicates with the core network through more than two radio air interfaces, the micro communication path further includes at least one intermediate routing node.

The initial access node is a small radio access node accessed by the UE through the radio access link.

The gateway node is a small radio access node capable of accessing to the core network via a wired port.

The intermediate routing node is a small radio access node for providing relay transmission, so as to realize the communication between the initial access node and the gateway node and finally realize the communication between the UE accessed the initial access node and the core network.

Figure 7:
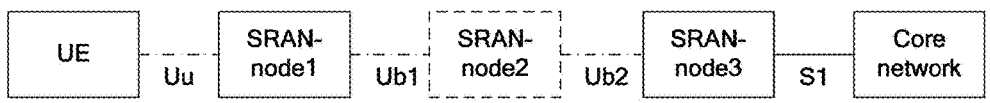
FIG. 7 is a schematic diagram showing an application scenario of implementing access stratum security according to an embodiment of the present disclosure.

FIG. 7 is a schematic diagram showing an application scenario of implementing access stratum security according to an embodiment of the present disclosure. Based on FIG. 3, in a future network, communication data between the UE and the core network needs to be transmitted through two or even more air interfaces. As shown in FIG. 7, assuming that a UE communicates with the core network through three air interfaces, the UE accesses a small radio access network node 1 (SRAN-node1) through a radio access link. The SRAN-node1 is referred to as an initial access node, and the interface between the UE and the SRAN-node1 is the radio access air interface, namely the Uu interface. In FIG. 7, the SRAN-node1 cannot access the core network directly through a wired interface (or has no wired interface). The SRAN-node1 communicates with a small radio access network node 2 (SRAN-node2) through a radio backhaul link. The SRAN-node2 is referred to as an intermediate routing node, and the interface between the SRAN-node1 and the SRAN-node2 is referred to as a radio backhaul interface, namely the Ub interface. The SRAN-node2 cannot access the core network directly via a wired interface either. The SRAN-node2 communicates, through a radio backhaul link, with a small radio access network node 3 (SRAN-node3) capable of accessing the core network directly through a wired interface. The SRAN-node3 is referred to as a gateway node, and the interface between the SRAN-node2 and SRAN-node3 is also referred to as the Ub interface. The SRAN-node3 and the core network, e.g., evolved packet core (EPC), are directly connected through a wired interface, and a logical interface between the SRAN-node3 and the EPC, which is carried on the wired interface, is the S1 interface in the related LTE. The intermediate routing node provides relay transmission, so as to realize the communication between the initial access node and the gateway node and finally realize the communication between the UE which accesses the initial access node and the core network.

FIG. 7 merely illustrates an example in which the UE communicates with the core network through three air interfaces (one Uu interface and two Ub interfaces). However, in a future network, the UE may communicate with the core network through two air interfaces (one Uu interface and one Ub interface). Alternatively, the UE may communicate with the core network through more than three air interfaces (one Uu interface and n Ub interfaces, where n≥2). That is, the UE communicates with the core network through at least two radio air interfaces. A communication path in which the UE communicates with the core network through at least two radio air interfaces at least includes the UE, the initial access node and the gateway node, where the two radio air interfaces include the radio access air interface (Uu interface) between the UE and the initial access node and the radio backhaul interface (Ub interface) between the initial access node and the gateway node. When the UE communicates with the core network through more than two radio air interfaces, the communication path further includes at least one intermediate routing node. In this case, the more than two radio air interfaces include the Uu interface between the UE and the initial access node, the Ub interface between the initial access node and the intermediate routing node, and the Ub interface between the intermediate routing node and the gateway node. If there are more than two intermediate routing nodes, the communication path further includes the Ub interface between the intermediate routing nodes.

For the application scenario of implementing access stratum security according to an embodiment of the present disclosure shown in FIG. 7, the end-to-end control plane access stratum security implemented in step 601 is performed between the UE and the initial access node.

Figure 1:
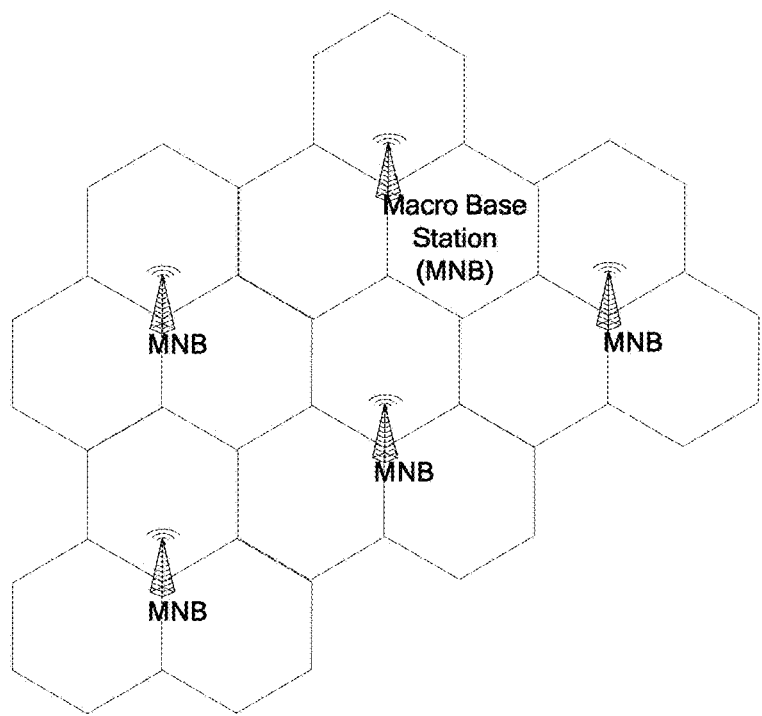
FIG. 1 is a schematic diagram of a network topology of a conventional cellular radio access network.
Figure 2:
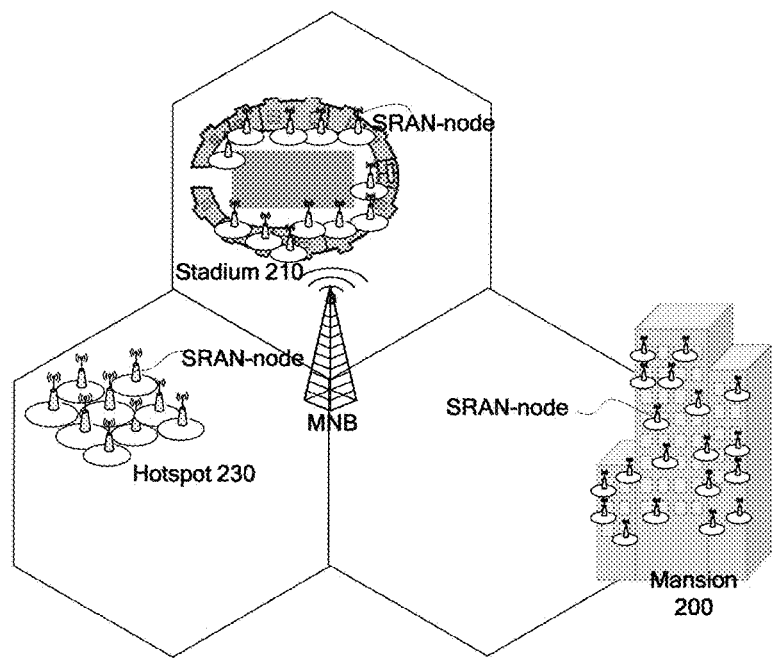
FIG. 2 is a schematic diagram of deploying a UDN in a specific area of a conventional cellular radio access network.
Figure 8:
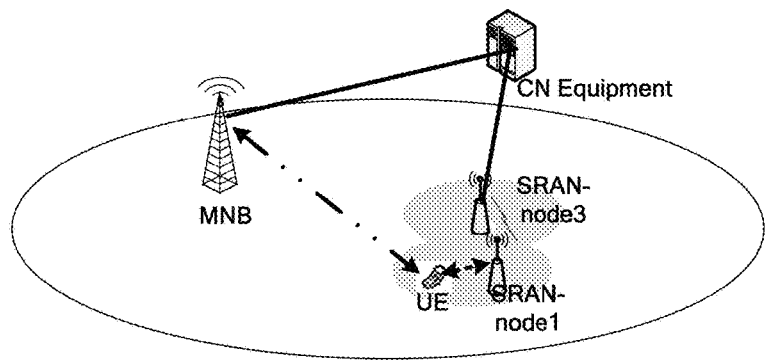
FIG. 8 is a schematic diagram showing another application scenario of implementing access stratum security according to an embodiment of the present disclosure.

FIG. 8 is a schematic diagram showing another application scenario of implementing access stratum security according to an embodiment of the present disclosure. In practice use, based on FIG. 2, in another scenario, the future ultra-dense network is deployed in an area with conventional cellular coverage. As shown in FIG. 8, small nodes such as SRAN-node 1 and SRAN-node 3 are densely deployed in the coverage area of the macro base station (MNB) (for clarity of illustration, only two small nodes are illustrated in FIG. 8). The SRAN-node 3 may be connected to an equipment in the core network (CN) through the wired backhaul link, while the SRAN-node 1 can only be connected to the SRAN-node 3 through the radio backhaul link and then be connected to the equipment in the CN through the SRAN-node3. In FIG. 8, on the one hand, the UE is connected to the MNB through the radio access link between the UE and the MNB; on the other hand, the UE is connected to the SRAN-node 1 through the radio access link between the UE and the SRAN-node 1. Through the connections between the UE with the MNB and between the UE with the SRAN-node 1, the services may be reasonably allocated to the two connections as needed. For example, high-traffic services are transmitted between the UE and SRAN-node1, while low-traffic services are transmitted between the UE and the MNB. For another example, high-reliability services are transmitted between the UE and the MNB, while services requiring less reliability are transmitted between the UE and the SRAN-node 1, etc. The control plane signaling and the user plane data may be separated through the two connections between the UE with the MNB and between the UE with the SRAN-node 1. For example, the control plane signaling is transmitted between the UE and the MNB, while the user plane data is transmitted between the UE and the SRAN-node 1.

That is, for the scenario with two connections shown in FIG. 8, on the one hand, the UE is connected to a macro base station (MNB) through a radio access link (the communication path in which the UE accesses the MNB through radio access links and then accesses the core network finally is referred to as a macro communication path); on the other hand, the UE is connected to the SRAN-node through a radio access link (the communication path in which the UE accesses the SRAN-node through radio access links and then accesses the core network finally is referred to as a micro communication path). In the micro communication path of the UE, the UE communicates with the core network through at least two radio air interfaces. Similarly, the micro communication path at least includes the UE, the initial access node, the gateway node, and the two radio air interfaces include the radio access air interface (Uu interface) between the UE and the initial access node and the radio backhaul interface (Ub interface) between the initial access node and the gateway node. When the UE communicates with the core network through more than two radio air interfaces, the micro communication path further includes at least one intermediate routing node. The more than two radio air interfaces include the Uu interface between the UE and the initial access node, the Ub interface between the initial access node and the intermediate routing node and the Ub interface between the intermediate routing node and the gateway node. When there are more than two intermediate routing nodes, the more than two radio air interfaces further include the Ub interface between the intermediate routing nodes.

For the application scenario of implementing access stratum security according to an embodiment of the present disclosure shown in FIG. 8, the end-to-end control plane access stratum security implemented in step 601 is performed between the UE and the macro base station.

The specific implementations of the method of the embodiments of the present disclosure will be described later in detail with respect to different application scenarios of the embodiments of the present disclosure.

Figure 9:
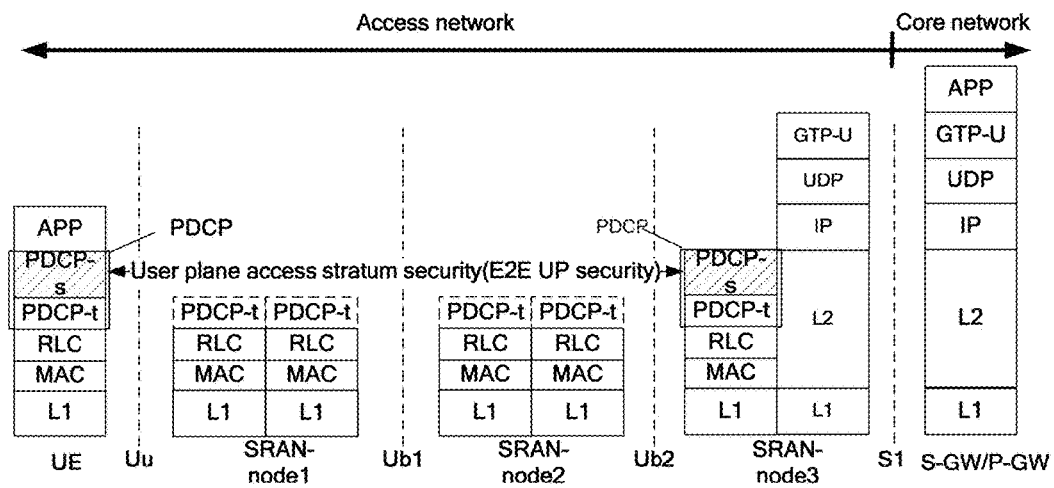
FIG. 9 is a schematic diagram showing a user plane access stratum security protocol architecture based on the application scenario shown in FIG. 7 according to an embodiment of the present disclosure.

FIG. 9 shows a user plane access stratum security protocol architecture based on the application scenario shown in FIG. 7 according to an embodiment of the present disclosure. The end-to-end user plane access stratum security (E2E UP security) is performed between the UE and the gateway node (such as the SRAN-node 3). That is, the end-to-end user plane access stratum security is performed between a packet data convergence protocol security (PDCP-s) layer of the UE and the PDCP-s layer of the SRAN-node 3.

As shown in FIG. 9, the UE and the SRAN-node 3 are at two ends of the E2E UP security. Each of the UE and the SRAN-node 3 includes, from bottom to top, a physical layer (L1), a media access control (MAC) layer, a radio link control (RLC) layer, a packet data convergence protocol thinned (PDCP-t) layers and a packet data convergence protocol security (PDCP-s) layer.

The PDCP-s layer is configured to perform the following functions: header compression and decompression, secure operations. The secure operations include encryption, decryption, integrity protection and integrity verification.

The PDCP-t layer is configured to perform functions of the PDCP sub-layer in the related LTE technologies other than the functions of the PDCP-s layer, such as, data transmission, maintenance of the PDCP packet sequence number, transmitting packet data to up layer in order when the RLC layer is reestablished, detecting and discarding duplicate packets of mode packet data confirmed by the RLC when the RLC layer is reestablished, discarding packet based on time and discarding duplicate packet.

It should be noted that the PDCP-s layer and the PDCP-t layer may also be combined into one protocol layer, that is, the PDCP sub-layer in the related LTE technologies.

In embodiments of the present disclosure, when performing the end-to-end user plane access stratum security between the UE and the gateway node (such as the SRAN-node 3), other access network nodes (including the initial access node and the intermediate routing node) in the communication path of the UE are not involved in the access stratum security operation. Therefore, as shown in FIG. 9, no PDCP-s protocol layer is required on other access network nodes (i.e., the initial access node such as the SRAN-node1 and the intermediate routing node such as the SRAN-node2) of the communication path of the UE. In order to implement communication between two parties on each radio air interface in the communication path of the UE, at each radio air interface of the SRAN-node1 and the SRAN-node2, each of the SRAN-node1 and the SRAN-node2 includes the following layers from bottom to top: L1, MAC and RLC and the like. The SRAN-node1 and the SRAN-node2 may further include the PDCP-t protocol layer. Details are set forth below.

To communicate with the UE through the Uu interface, the SRAN-node 1 includes, at the Uu interface side, protocol layers such as L1, MAC and RLC from bottom to top. The SRAN-node 1 further includes the PDCP-t protocol layer at the Uu interface side.

To communicate with the intermediate routing node SRAN-node 2 through the Ub1 interface, the SRAN-node 1 includes, at the Ub1 interface side, protocol layers such as L1, MAC and RLC from bottom to top. The SRAN-node 1 further includes the PDCP-t protocol layer at the Ub1 interface side.

To communicate with the initial access node SRAN-node 1 through the Ub1 interface, the SRAN-node 2 includes, at the Ub1 interface side, protocol layers such as L1, MAC and RLC from bottom to top. The SRAN-node 2 further includes the PDCP-t protocol layer at the Ub1 interface side.

To communicate with the gateway node SRAN-node 3 through the Ub2 interface, the SRAN-node 2 includes, at the Ub2 interface side, protocol layers such as L1, MAC and RLC from bottom to top. The SRAN-node 2 further includes the PDCP-t protocol layer at the Ub2 interface side.

Taking the application scenario shown in FIG. 7 as an example, the process of performing the end-to-end user plane access stratum security between the UE and the gateway node (such as the SRAN-node3) includes: performing end-to-end user plane encryption and user plane integrity protection between the UE and the SRAN-node 3. With reference to FIG. 9, the user plane data of upper layers of the UE (i.e., data from the protocol layers above the PDCP-s layer of the UE. For example, the user plane data of upper layers of the UE is data of an application layer (APP) of the UE shown in FIG. 9, or the NAS signaling of the UE and the like) is subjected to encryption and integrity protection in the PDCP-s layer before being transmitted to the air interface (Uu interface), and is decrypted and integrity verified by the SRAN-node 3 in the PDCP-s layer after being transmitted to the SRAN-node 3. Likewise, when the gateway node (such as the SRAN-node 3) acquires user plane data to be transmitted to the UE from the S-GW/P-GW of the core network, the user plane data is subjected to encryption and integrity protection in the PDCP-s layer of the SRAN-node 3 by the SRAN-node 3 before being transmitted to the air interface (Ub interface); and the data is decrypted and integrity verified by the UE in the PDCP-s layer of the UE after being transmitted to the UE. That is, all user plane data are subjected to the end-to-end user plane encryption and integrity protection before being transmitted via the air interfaces for the first time, thereby ensuring the user plane data to be secure when being transmitted in the communication path including two or more air interfaces.

Figure 10:
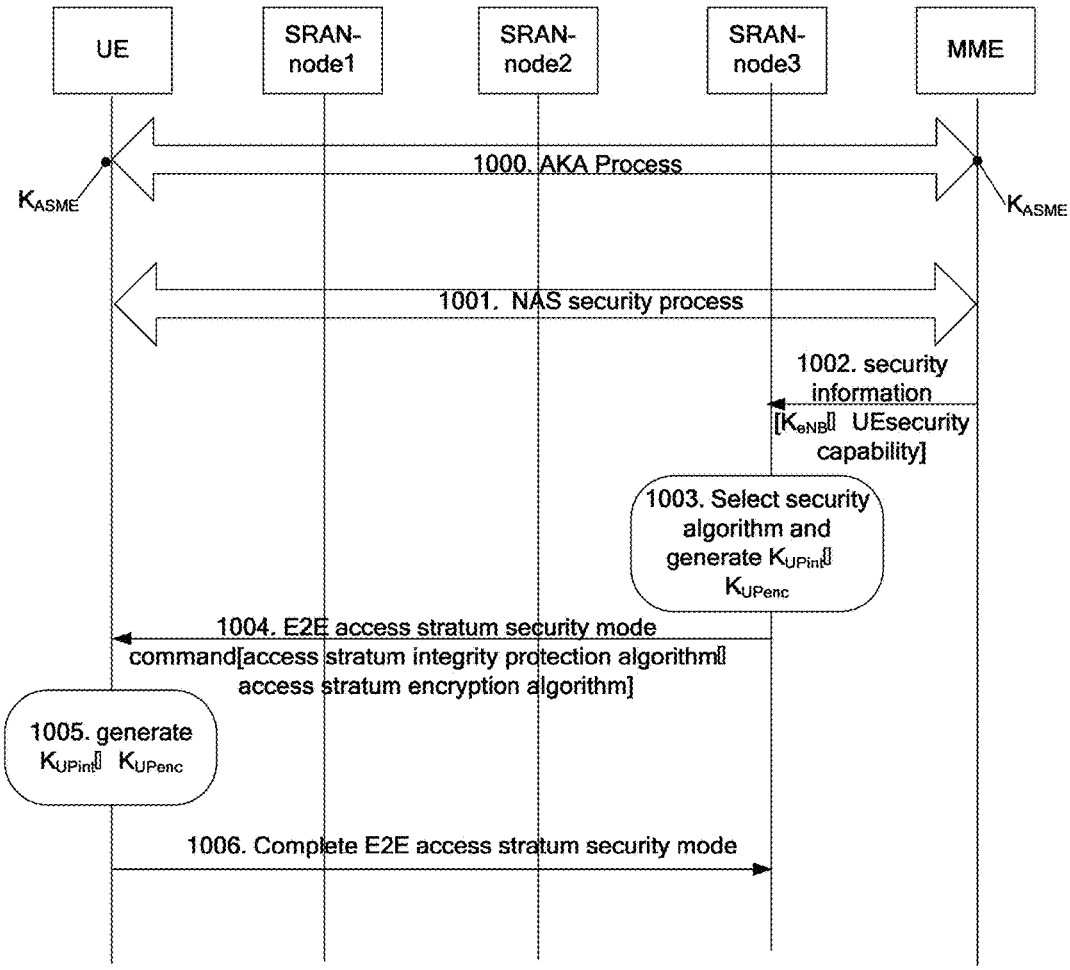
FIG. 10 is a flowchart of keys generation for implementing user plane access stratum security based on the application scenario shown in FIG. 7 according to an embodiment of the present disclosure.

FIG. 10 is a flowchart of keys generation for implementing user plane access stratum security based on the application scenario shown in FIG. 7 according to an embodiment of the present disclosure. Through the method for generating security keys shown in FIG. 10, the user plane encryption key $K_{UPenc}$ and the user plane integrity protection key $K_{UPint}$ required for performing the end-to-end user plane encryption and user plane integrity protection between the UE and the gateway node in embodiments of the present disclosure may be generated. As shown in FIG. 10, the above process includes the following steps.

In step 1000: the AKA process is performed between the UE and the core network. Each of the UE and an equipment in the core network (such as the HSS) calculates the security management keys $K_{ASME}$ after the AKA is completed.

The specific implementation of performing the AKA process between the UE and the core network in this step is well-known to those skilled in the art and is not intended to limit the protection scope of the present application, and details are not described herein.

In step 1001, the NAS security process (NAS SMC) is performed between the UE and an equipment in the core network (such as the MME). After the NAS security process is performed, the UE and the MME each generate NAS security keys, namely the NAS integrity keys $K_{NAS\ int}$ and the NAS security key $K_{NAS\ enc}$.

In the NAS security process, in addition to the NAS security key, the MME further calculates and generates a root key $K_{eNB}$ of the access stratum based on the $K_{ASME}$ generated by the AKA and the uplink NAS COUNT generated in the NAS SMC.

The specific implementation of performing the NAS security process between the UE and MME in this step is well-known to those skilled in the art and is not intended to limit the protection scope of the present application, and details are not described herein.

In step 1002, the MME transmits security information of the UE to the gateway node (such as the SRAN-node 3 in FIG. 7) in the communication path of the UE.

In this step, the security information of the UE transmitted to the SRAN-node3 by the MME includes the root key $K_{eNB}$ of the access stratum and the UE security capability. The UE security capability includes integrity protection algorithms and encryption algorithms supported by the UE.

In step 1003, the SRAN-node 3 selects the security algorithm and generates end-to-end user plane security keys, namely, the user plane integrity key $K_{UPint}$ and the user plane security key $K_{UPenc}$.

In this step, the SRAN-node 3 selects the integrity protection algorithm and the encryption algorithm supported by both of the UE and the SRAN-node 3 from the UE security capability, and the user plane integrity key $K_{UPint}$ and the user plane security key $K_{UPenc}$ are derived from the root key $K_{eNB}$ of the access stratum. The specific key deriving algorithm is identical to the method in related LTE art, and is well-known to those skilled in the art, and the details are not described herein.

In step 1004, the SRAN-node 3 sends an E2E access stratum security mode command to the UE. The E2E access stratum security mode command is carried with the access stratum user plane integrity protection algorithm and the access stratum user plane encryption algorithm adopted by the SRAN-node 3 for locally deriving the user plane integrity key $K_{UPint}$ and the user plane security key $K_{UPenc}$.

In this step, the E2E access stratum security mode command transmitted to the UE from the SRAN-node 3 is transmitted to the UE through the SRAN-node 2 and the SRAN-node 1.

In step 1005, the UE generates the end-to-end user plane security keys, namely, the user plane integrity key $K_{UPint}$ and the user plane security key $K_{UPenc}$.

In this step, the UE generates the root key $K_{eNB}$ of the access stratum according to the security management key $K_{ASME}$ generated by the AKA process and the uplink NAS COUNT generated in the NAS security process, and derives the user plane integrity key $K_{UPint}$ and the user plane security key $K_{UPenc}$ according to the access stratum user plane integrity protection algorithm and the access stratum user plane encryption algorithm carried in the E2E access stratum security mode command from the SRAN-node 3.

In step 1006, the UE transmits a message indicating that the E2E access stratum security mode is completed to the SRAN-node 3 through the SRAN-node 1 and SRAN-node 2.

Henceforth, the end-to-end user plane access stratum security keys (namely, the user plane integrity key $K_{UPint}$ and the user plane security key $K_{UPenc}$) are generated between the UE and the gateway node, and the end-to-end user plane access stratum security procedure may be performed between the UE and the gateway node.

Figure 11:
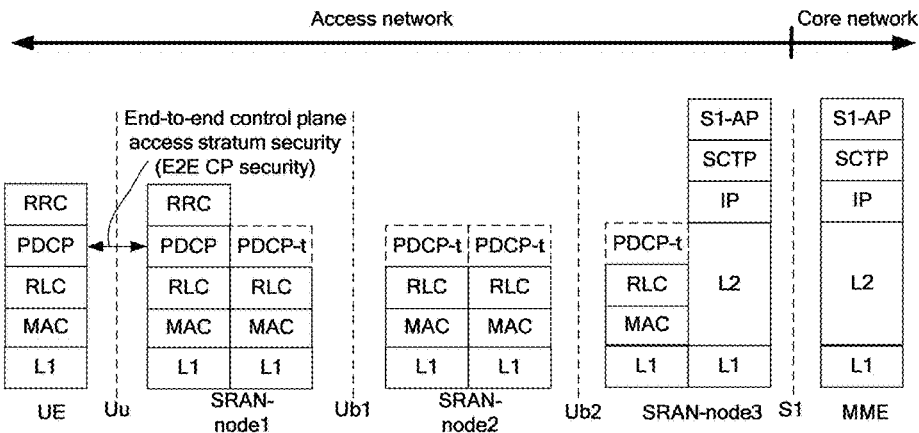
FIG. 11 is a schematic diagram showing a control plane access stratum security protocol architecture based on the application scenario shown in FIG. 7 according to an embodiment of the present disclosure.

FIG. 11 shows a control plane access stratum security protocol architecture based on the application scenario shown in FIG. 7 according to an embodiment of the present disclosure. The end-to-end control plane access stratum security (E2E CP security) process is performed between the UE and the initial access node (such as the SRAN-node 1), that is, the end-to-end control plane access stratum security is performed between the PDCP layer of the UE and the PDCP layer of the SRAN-node 1.

As shown in FIG. 11, the UE and the SRAN-node 1 are at two sides of the E2E CP security, and each include protocol layers such as L1, MAC, RLC and PDCP from bottom to top.

In this embodiment, during the implementation of the end-to-end control plane access stratum security between the UE and the initial node (such as the SRAN-node 1), other access network access nodes (including the intermediate routing node and the gateway node) in the communication path of the UE are not involved in the control plane access stratum security operation. Therefore, as shown in FIG. 11, it is not necessary to implement security function in the PDCP layer at other access network nodes (namely, the intermediate routing node such as the SRAN-node 2 and the gateway node such as the SRAN-node 3) in the communication path of the UE. However, in order to implement communication between two parties on each radio air interface in the communication path of the UE, each of the SRAN-node 1, the SRAN-node 2 and the SRAN-node 3, at each radio backhaul link interface of their communication, includes protocol layers such as L1, MAC and RLC from bottom to top. The SRAN-node 1, the SRAN-node 2 and the SRAN-node 3 may further include the PDCP-t protocol layer. Details are described below.

For achieving the communication between the SRAN-node 1 and the SRAN-node 2 via the Ub1 interface, at the side of the Ub1 interface, the SRAN-node 1 and the SRAN-node 2 each include protocol layers such as L1, MAC and RLC from bottom to top. The SRAN-node 1 and the SRAN-node 2 may further include the PDCP-t protocol layer at the side of the Ub1 interface.

For achieving the communication between the SRAN-node 2 and the SRAN-node 3 via the Ub2 interface, at the side of the Ub2 interface, the SRAN-node 2 and the SRAN-node 3 each include protocol layers such as L1, MAC and RLC from bottom to top. The SRAN-node 2 and the SRAN-node 3 may further include the PDCP-t protocol layer at the side of the Ub2 interface.

Taking the application scenario shown in FIG. 7 as an example, the process of performing the end-to-end control plane access stratum security between the UE and the initial access node (such as the SRAN-node 1) includes: performing end-to-end control plane encryption and control plane integrity protection between the UE and the SRAN-node 1. With reference to FIG. 11, the uplink RRC signaling of the UE is subjected to encryption and integrity protection in the PDCP layer before being transmitted to the air interface Uu; and the SRAN-node 1 performs decryption and integrity verification on the RRC signaling after the RRC signaling is received. Likewise, the SRAN-node 1 as the initial access node of the UE needs to perform, in the PDCP layer, encryption and integrity protection on the downlink RRC signaling to be transmitted to the UE before the downlink RRC signaling is transmitted to the Uu interface, and the UE performs decryption and integrity verification on the RRC signaling after receiving the RRC signaling. In this way, the RRC signaling is ensured to be secure when being transmitted through the air interface.

Figure 12:
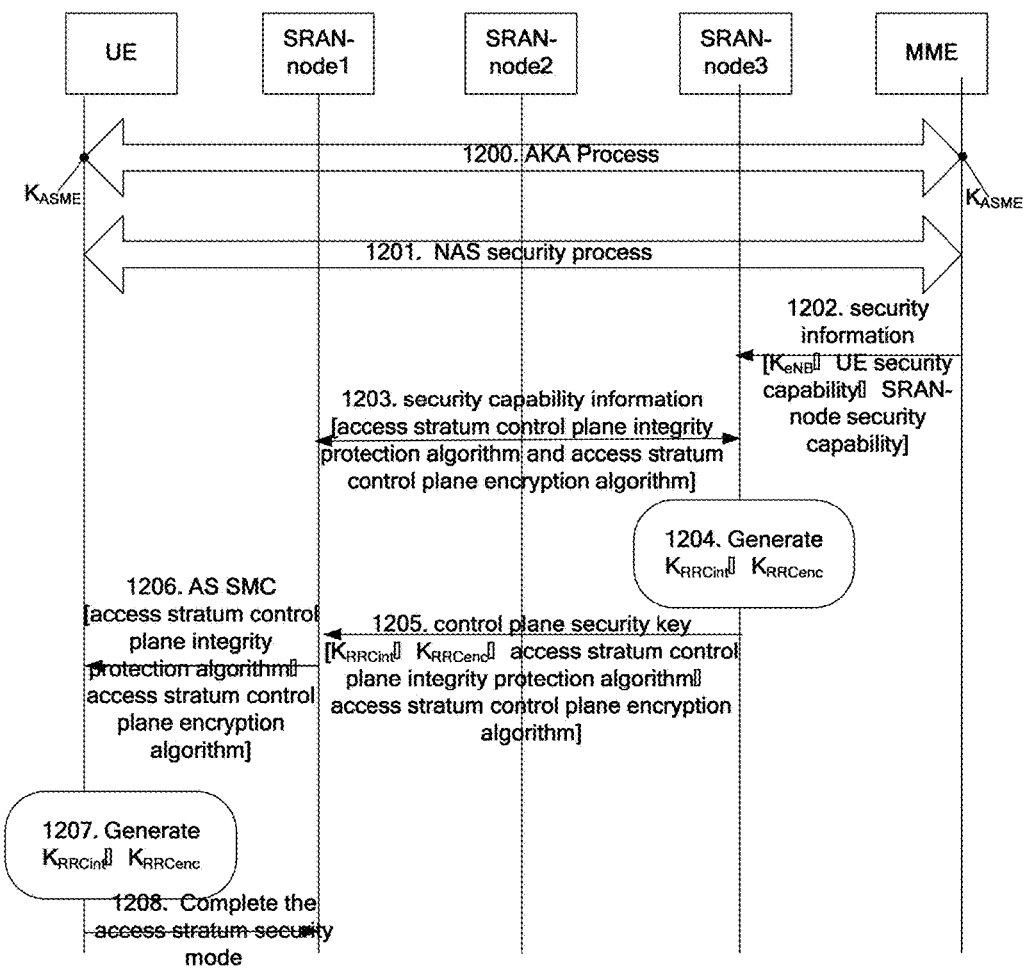
FIG. 12 is a first flowchart of keys generation for implementing control plane access stratum security based on the application scenario shown in FIG. 7 according to an embodiment of the present disclosure.

FIG. 12 is a first flowchart of keys generation for implementing control plane access stratum security based on the application scenario shown in FIG. 7 according to an embodiment of the present disclosure. FIG. 12 provides a method for generating keys for end-to-end control plane access stratum security between the UE and the initial access node according to an embodiment of the present disclosure. Through the generation method shown in FIG. 12, the control plane encryption key $K_{RRCenc}$ and the control plane integrity protection key $K_{RRCint}$ required for performing the end-to-end control plane encryption and integrity protection between the UE and the initial access node may be generated. As shown in FIG. 12, the above process includes the following steps.

In step 1200, the AKA process is performed between the UE and the core network. The UE and an equipment in the core network (such as the HSS) each calculate the security management keys $K_{ASME}$ after the AKA is completed.

The specific implementation of performing the AKA process between the UE and the core network in this step is well-known to those skilled in the art and is not intended to limit the protection scope of the present application, and details are not described herein.

In step 1201, the NAS security process (NAS SMC) is performed between the UE and an equipment in the core network (such as the MME). After the NAS security process is performed, the UE and the MME each generate NAS security keys, namely the NAS integrity keys $K_{NAS\ int}$ and the NAS security key $K_{NAS\ enc}$.

In the NAS security process, in addition to the NAS security key, the MME further calculates and generates the root key $K_{eNB}$ of the access stratum based on the $K_{ASME}$ generated by the AKA and the uplink NAS COUNT generated in the NAS SMC.

The specific implementation of performing the NAS security process between the UE and MME in this step is well-known to those skilled in the art and is not intended to limit the protection scope of the present application, and details are not described herein.

In step 1202, the MME transmits security information of the UE to the gateway node (such as the SRAN-node 3 in FIG. 7) in the communication path of the UE. The security information of the UE includes the root key $K_{eNB}$ of the access stratum and the UE security capability. The specific implementation of this step is identical to step 1002 in FIG. 10, and is not described herein again.

If the security capability information of the initial access node (such as the SRAN-node 1) of the UE is obtained by the MME, the MME may further transmit the security capability information of the SRAN-node 1 to the gateway node. The security capability information of the SRAN-node 1 includes access stratum control plane integrity protection algorithm and access stratum control plane encryption algorithm supported by the SRAN-node 1.

In step 1203, the SRAN-node 3 requests the initial access node (such as the SRAN-node 1 in FIG. 7) accessed by the UE for the security capability information supported by the SRAN-node 1. The security capability information supported by the SRAN-node 1 includes the access stratum control plane integrity protection algorithm and access stratum control plane encryption algorithm.

Herein, the SRAN-node 3 requests the SRAN-node 1 for the message of control plane security algorithm through the SRAN-node 2, and the SRAN-node 1 transmits the message of control plane security algorithm through the SRAN-node 2. The specific implementation of the message may adopt the existing message or a new message. The specific implementation is easy to be realized by those skilled in the art, is not limited herein or not intend to limit the protection scope of the present disclosure, and is not repeated herein.

If the SRAN-node 3 has obtained the security capability information of the SRAN-node 1 from the MME in step 1202, this step may be omitted In step 1204, the SRAN-node 3 generates the control plane security keys, that is, the security key $K_{RRCenc}$ of the control plane and the integrity protection key $K_{RRCint}$ of the control plane.

In this step, the SRAN-node 3 selects the access stratum control plane security algorithms supported by both of the SRAN-node 3 and SRAN-node 1 from the UE security capability and the SRAN-node 1 security capability, that is, selects the control plane integrity protection algorithm and the control plane encryption algorithm supported by both of the SRAN-node 3 and SRAN-node 1. Then, the SRAN-node 3 derives the security key $K_{RRCenc}$ of the control plane and the integrity protection key $K_{RRCint}$ of the control plane from the root key $K_{eNB}$ of the access stratum.

In step 1205, the SRAN-node 3 informs the SRAN-node 1 of the control plane security keys. The content informed includes the security key $K_{RRCenc}$ of the control plane, the integrity key $K_{RRCint}$ of the control plane, the access stratum control plane integrity protection algorithm and the access stratum control plane encryption algorithm. The control plane security keys are transmitted to the SRAN-node 1 via SRAN-node 2.

In step 1206, the SRAN-node 1 transmits an access stratum security mode command to the UE. The access stratum security mode command is carried with the access stratum control plane integrity protection algorithm and the access stratum control plane encryption algorithm which are used for deriving the control plane keys by the SRAN-node 3 and received by the SRAN-node 1.

In step 1207, the UE generates the control plane security keys, namely, the security key $K_{RRCenc}$ of the control plane and the integrity key $K_{RRCint}$ of the control plane.

In this step, the UE derives the security key $K_{RRCenc}$ of the control plane and the integrity key $K_{RRCint}$ of the control plane by using the security management key $K_{ASME}$ generated by the AKA process, the root key $K_{eNB}$ of the access stratum generated based on the uplink NAS COUNT generated in the NAS security process, and the received access stratum control plane security algorithms (namely, the access stratum control plane integrity protection algorithm and the access stratum control plane encryption algorithm).

In step 1208, the UE transmits a message indicating that the access stratum security mode is completed to the SRAN-node 1.

Henceforth, the end-to-end control plane access stratum security keys (namely, the security key $K_{RRCenc}$ of the control plane and the integrity key $K_{RRCint}$ of the control plane) are generated between the UE and the initial access node, and the end-to-end control plane access stratum security procedure may be performed between the UE and the initial access node.

Figure 13:
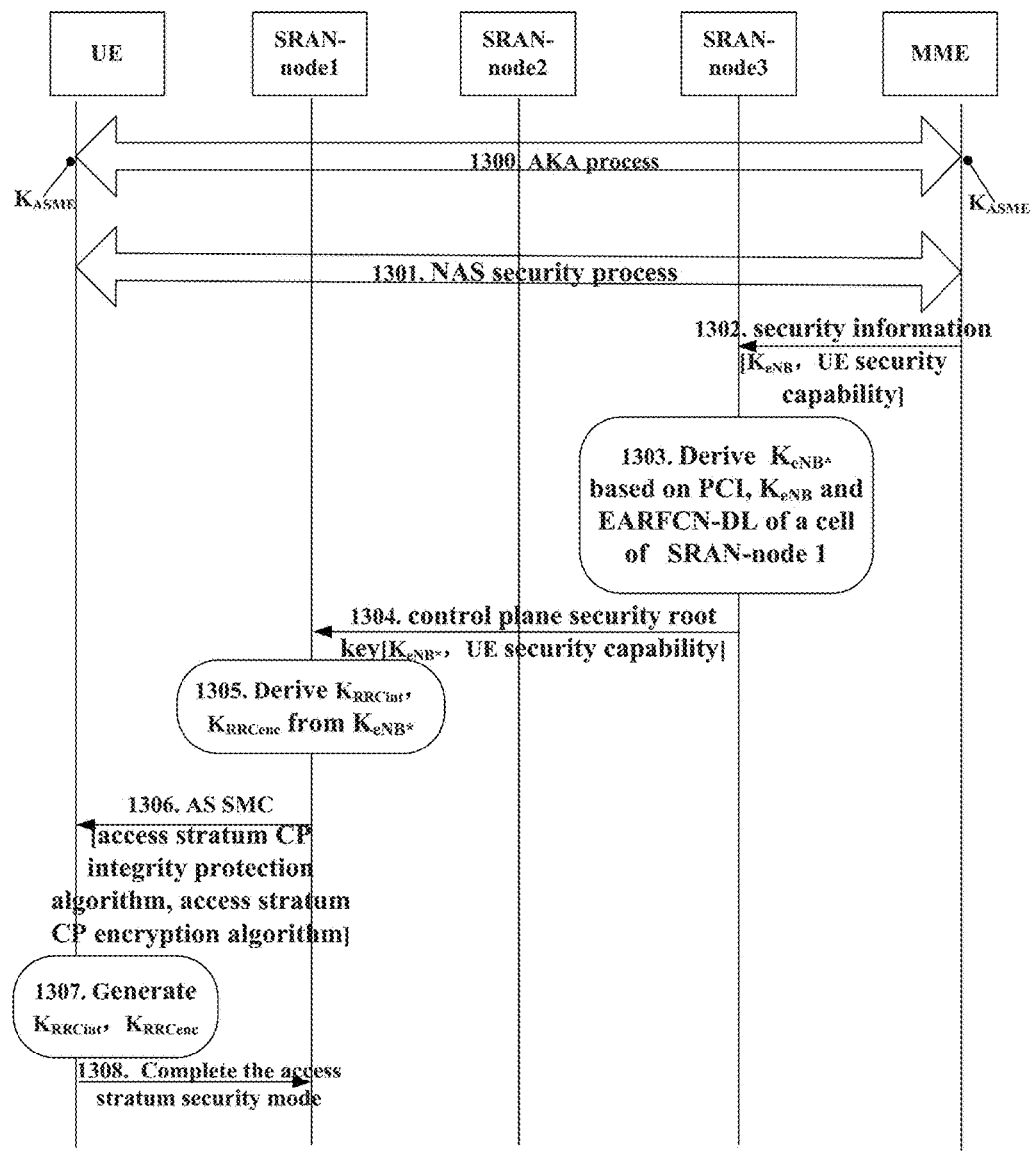
FIG. 13 is a second flowchart of keys generation for implementing control plane access stratum security based on the application scenario shown in FIG. 7 according to an embodiment of the present disclosure.

FIG. 13 is a second flowchart of keys generation for implementing control plane access stratum security based on the application scenario shown in FIG. 7 according to an embodiment of the present disclosure. Through the method for generating security keys shown in FIG. 13, the control plane encryption key $K_{RRCenc}$ and the control plane integrity protection key $K_{RRCint}$ required for performing the end-to-end control plane encryption and control plane integrity protection between the UE and the initial access node according to embodiments of the present disclosure may be generated. As shown in FIG. 13, the above process includes the following steps.

Steps 1300 to 1302 are identical to steps 1200 to 1202 in FIG. 12, and are not repeated herein.

In step 1303, after receiving the security information of the UE, the SRAN-node 3 derives an access stratum control plane root key $K_{eNB*}$ according to the received root key $K_{eNB}$ of the access stratum, a physical cell identity (PCI) and an E-UTRA absolute radio frequency channel number (EARFCN-DL) of the cell of the SRAN-node 1 accessed by the UE.

In step 1304, the derived control plane security root key $K_{eNB*}$ is transmitted to the SRAN-node 1 by the SRAN-node 3.

If the SRAN-node 1 does not have the UE security capability of the UE, the UE security capability is also transmitted to the SRAN-node 1 by the SRAN-node 3 in step 1304.

In step 1305, the SRAN-node 1 selects the access stratum control plane integrity protection algorithm and the access stratum encryption algorithm, and derives the control plane security keys (that is, the security key $K_{RRCenc}$ of the control plane and the integrity key $K_{RRCint}$ of the control plane) according to the $K_{eNB*}$.

The relevant key deriving algorithm in this step is consistent with the control plane key deriving algorithm in related LTE art and is not intended to limit the scope of the present disclosure, and the details are not described herein.

In step 1306, the access stratum security mode command is transmitted to the UE by the SRAN-node 1. The access stratum security mode command is carried with the access stratum control plane integrity protection algorithm and the access stratum control plane encryption algorithm selected and used by the SRAN-node 1 when deriving the access stratum control plane keys.

In step 1307, the UE generates the control plane security keys, namely, the security key $K_{RRCenc}$ of the control plane and the integrity key $K_{RRCint}$ of the control plane.

In this step, firstly, the UE generates the root key $K_{eNB}$ of the access stratum according to the security management key $K_{ASME}$ generated by the AKA process and the uplink NAS COUNT generated in the NAS security process; secondly, the UE derives the access stratum control plane root key $K_{eNB*}$ according to the root key $K_{eNB}$ of the access stratum, the EARFCN-DL and PCI of the cell of the SRAN-node 1 accessed by the UE; and finally, the UE derives the control plane security keys (namely, the security key $K_{RRCenc}$ of the control plane and the integrity key $K_{RRCint}$ of the control plane) according to the $K_{eNB*}$ with the access stratum control plane integrity protection algorithm and the access stratum control plane encryption algorithm received in step 1306.

In step 1308, the UE transmits a message indicating that the access stratum security mode is completed to the SRAN-node 1.

Henceforth, the end-to-end control plane access stratum security keys (namely, the security key $K_{RRCenc}$ of the control plane and the integrity key $K_{RRCint}$ of the control plane) are generated between the UE and the initial access node, and the end-to-end control plane access stratum security procedure may be performed between the UE and the initial access node.

It can be seen from the keys generation implementation flowchart and the corresponding description in FIG. 10, FIG. 12, and FIG. 13, with respect to the scenario shown in FIG. 7, in the key generation flowchart in this embodiment of the present disclosure, after the AKA and NAS security processes, the process of generating the end-to-end user plane access stratum security key and the process of generating the end-to-end control plane access stratum security key may be performed individually. Therefore, in the present embodiment, when the end-to-end user plane access stratum security key and the end-to-end control plane access stratum security key need to be updated, they may be updated individually. For example, when a PDCP COUNT of a certain radio bear (RB) of the user plane rolls over and needs to be restarted to count, the gateway node (such as the SRAN-node 3) may initiate an independent end-to-end user plane access stratum security key updating process, while keeping the end-to-end control plane access stratum security key between the UE and the initial access node unchanged. Specifically, the actions of initiating end-to-end user plane access stratum security key updating by the gateway node (such as the SRAN-node 3) may be as follows: the gateway node (such as the SRAN-node 3) generates a new $K_{eNB}$ based on $K_{eNB}$ and EARFCN-DL and PCI of the cell of the gateway node, and then the gateway node (such as the SRAN-node 3) generates a new user plane access stratum security key based on the $K_{eNB}$ with the method described in steps 1003 to 1006 in FIG. 10. Herein, in step 1004, in addition to the selected access stratum integrity protection algorithm and the access stratum encryption algorithm, the new generated $K_{eNB}$ is also notified to the UE by the gateway node (such as the SRAN-node 3), and the UE generates new user plane access stratum security keys based on the received $K_{eNB}$, the access stratum integrity protection algorithm and the access stratum encryption algorithm.

It can be seen from the above description of the scenario shown in FIG. 7 that, in embodiments of the present disclosure, the user plane performs the end-to-end access stratum security between the UE and the gateway node in the communication path of the UE, and the control plane performs the end-to-end access stratum security between the UE and the initial access node accessed by the UE in the communication path of the UE. Through the method for implementing access stratum security based on the application scenario shown in FIG. 7 according to embodiments of the present disclosure, on the one hand, no matter how many air interfaces are in the communication path of the UE (that is, no matter how many intermediate routing nodes are in the communication path of the UE), the user plane security is only performed between the UE and the gateway node through the end-to-end manner, which greatly ensures user plane security and avoids the safe leakage risk due to multiple air interfaces (namely multiple intermediate routing nodes). Since the control plane security is only performed between the UE and the initial access node through the end-to-end manner, the delay in control plane security procedure is reduced while ensuring the control plane security. On the other hand, the user plane security is only performed between the UE and the gateway node through the end-to-end manner Therefore, when the UE moves between different SRAN-nodes, as long as the communication paths of the UE are finally connected to the core network through the same node, the user plane security is not changed, thereby improving the mobility performance of the UE. In addition, since the user plane security is only performed between the UE and the gateway node through the end-to-end manner, the user plane security will not be changed no matter how the intermediate nodes in the communication path of the UE change, thereby ensuring the transmission continuity of the user plane data of the UE.

Figure 14:
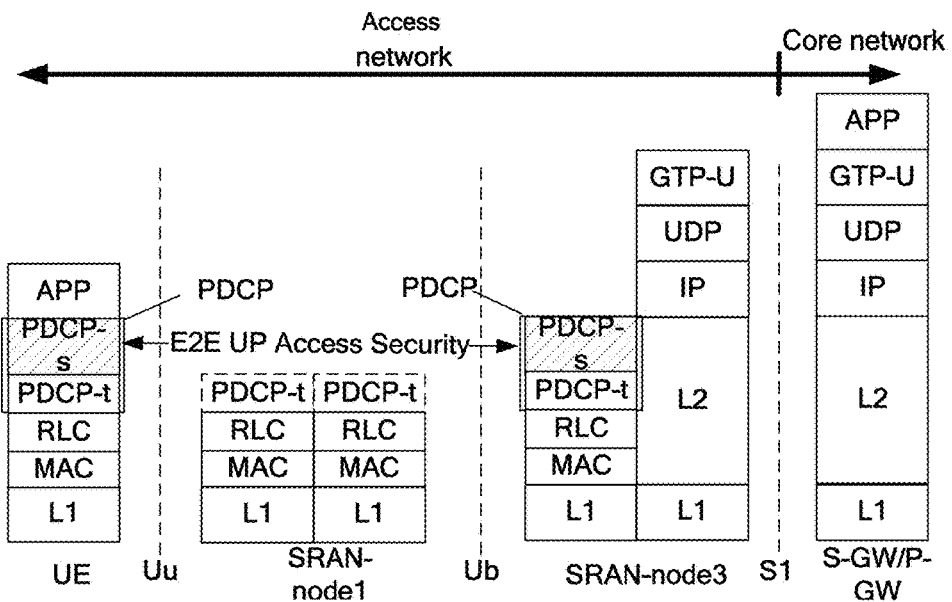
FIG. 14 is a schematic diagram showing a user plane access stratum security protocol architecture based on the application scenario shown in FIG. 8 according to an embodiment of the present disclosure.

FIG. 14 is a schematic diagram showing a user plane access stratum security protocol architecture based on the application scenario shown in FIG. 8 according to an embodiment of the present disclosure. As shown in FIG. 14, the user plane performs the end-to-end access stratum security between the UE and the gateway node in the micro communication path of the UE. That is, the end-to-end user plane access stratum security process is performed between the PDCP-s layer of the UE and the PDCP-s layer of the gateway node (such as the SRAN-node 3 shown in FIG. 8). The UE and the SRAN-node 3 are at two sides of the E2E UP security respectively. The UE and the SRAN-node 3 each include the following layers from bottom to top: L1, MAC, RLC, PDCP-t and PDCP-s. Other access network nodes in the micro communication path of the UE, including the initial access node and the intermediate routing node, are not involved in the access stratum security operation that includes performing the end-to-end user plane encryption and user plane integrity protection between the UE and the gateway node SRAN-node 3.

Figure 15:
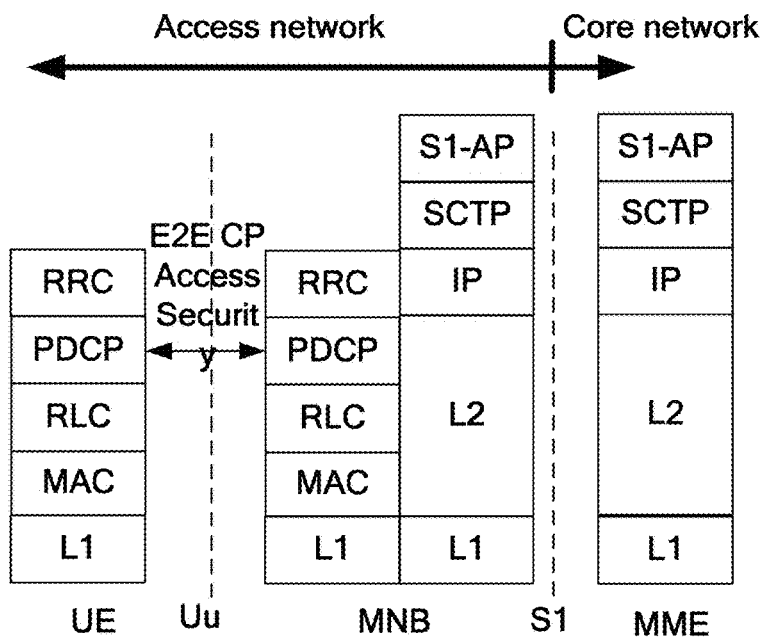
FIG. 15 is a schematic diagram showing a control plane access stratum security protocol architecture based on the application scenario shown in FIG. 8 according to an embodiment of the present disclosure.

FIG. 15 is a schematic diagram showing a control plane access stratum security protocol architecture based on the application scenario shown in FIG. 8 according to an embodiment of the present disclosure. As shown in FIG. 15, the control plane performs the end-to-end access stratum security between the UE and the macro base station in the macro communication path of the UE. That is, the end-to-end control plane access stratum security is performed between the PDCP layer of the UE and the PDCP layer of the macro base station (MNB). The UE and the MNB are at two sides of the E2E CP security respectively. The UE and the MNB each include the following layers from bottom to top: L1, MAC, RLC, PDCP and the like. The security operation includes performing the end-to-end control plane encryption and control plane integrity protection between the UE and the macro base station.

Figure 16:
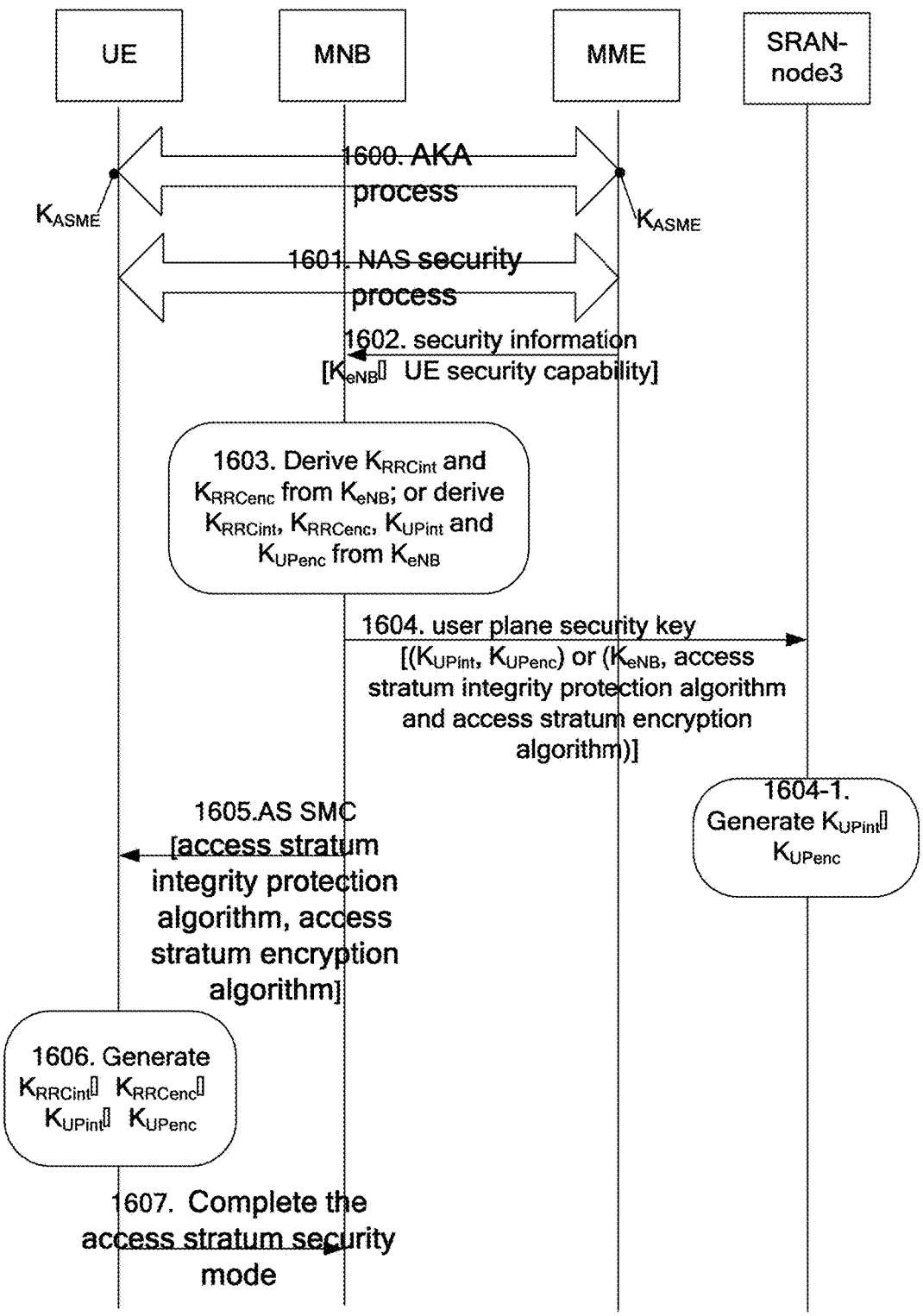
FIG. 16 is a flowchart of keys generation for implementing user plane access stratum security and control plane access stratum security based on the application scenario shown in FIG. 8 according to an embodiment of the present disclosure.

FIG. 16 is a flowchart of keys generation for implementing user plane access stratum security and control plane access stratum security based on the application scenario shown in FIG. 8 according to an embodiment of the present disclosure. As shown in FIG. 16, provided is a security key generation method for access stratum security in which the control plane and the user plane are separated in the scenario having two connections shown in FIG. 8. Through the security key generation method shown in FIG. 16, the following keys may be generated: the user plane encryption key $K_{UPenc}$ and user plane integrity protection key $K_{UPint}$ required for performing the end-to-end access stratum security between the UE and the gateway node in the micro communication path of the UE according to embodiments of the present disclosure; and the control plane encryption key $K_{RRCenc}$ and control plane integrity protection key $K_{RRCint}$ required for performing the end-to-end access stratum security between the UE and the macro base station in the macro communication path of the UE according to embodiments of the present disclosure. As shown in FIG. 16, the above process includes the following steps.

Steps 1600 to 1601 are identical to steps 1000 to 1001, and are not described again herein.

In step 1602, the security information of the UE is transmitted to the MNB by the MME.

In the NAS security process in step 1601, in addition to generating the NAS security keys, the MME further calculates and generates the root key $K_{eNB}$ of the access stratum based on the $K_{ASME}$ generated by the AKA and the uplink NAS COUNT generated in the NAS SMC.

In this step, the security information of the UE transmitted to the MNB by the MME includes the root key $K_{eNB}$ of the access stratum and the UE security capability. The UE security capability includes the integrity protection algorithms and the encryption algorithms supported by the UE.

In step 1603, the MNB selects the security algorithm, and derives, based on the root key $K_{eNB}$ of the access stratum, the control plane security keys, that is, the security key $K_{RRCenc}$ of the control plane and the integrity key $K_{RRCint}$ of the control plane. Alternatively, the MNB selects the security algorithm, and derives, based on the root key $K_{eNB}$ of the access stratum, the control plane security keys (that is, the security key $K_{RRCenc}$ and the integrity key $K_{RRCint}$ of the control plane) and the user plane security keys (that is, the security key $K_{UPenc}$ and the integrity key $K_{UPint}$ of the user plane).

In this step, the MNB selects the integrity protection algorithm and the encryption algorithm supported by both of the UE and the MNB from the UE security capability, and derives the above access stratum keys based on the root key $K_{eNB}$ of the access stratum. The specific key derivation algorithm is completely consistent with the method in the related LTE art, and the specific implementation is not intended to limit the protection scope of the present disclosure, and details are not described herein.

In step 1604, the MNB informs the gateway node (such as the SRAN-node 3 in FIG. 8) of the user plane security keys.

If the MNB has derived the security key $K_{UPenc}$ of the user plane and the integrity key $K_{UPint}$ of the user plane in step 1603, the MNB transmits the derived security key $K_{UPenc}$ of the user plane and the integrity key $K_{UPint}$ of the user plane to the SRAN-node 3 in this step.

If MNB fails to derive the user plane security keys in step 1603, the MNB transmits the root key $K_{eNB}$ of the access stratum and the security algorithms selected in step 1603 (including the access stratum integrity protection algorithm and the access stratum encryption algorithm) to the SRAN-node 3 in this step. At this moment, this embodiment of the present disclosure further includes step 1604-1. In step 1604-1, the SRAN-node 3 derives the user plane security keys (namely, the security key $K_{UPenc}$ of the user plane and the integrity key $K_{UPint}$ of the user plane) using the received root key $K_{eNB}$ of the access stratum and the access stratum security algorithms.

In step 1605, the MNB issues an access stratum security mode command to the UE. The access stratum security mode command is carried with the access stratum integrity protection algorithm and the access stratum encryption algorithm selected by the MNB in step 1603.

In step 1606, the UE generates the end-to-end user plane security keys (namely, the security key $K_{UPenc}$ of the user plane and the integrity key $K_{UPint}$ of the user plane) and the end-to-end control plane security keys (namely, the security key $K_{RRCenc}$ of the control plane and the integrity key $K_{RRCint}$ of the control plane).

In this step, the UE derives the following security keys based on the security management key $K_{ASME}$ generated in the AKA process, the root key $K_{eNB}$ of the access stratum generated by the uplink NAS COUNT generated in the NAS security process and the received security algorithms: the end-to-end user plane security keys (namely, the security key $K_{UPenc}$ of the user plane and the integrity key $K_{UPint}$ of the user plane) and the end-to-end control plane security keys (namely, the security key $K_{RRCenc}$ of the control plane and the integrity key $K_{RRCint}$ of the control plane).

In step 1607, the UE transmits a message indicating that the access stratum security mode is completed to the MNB.

Henceforth, the end-to-end user plane access stratum security keys (namely, the integrity key $K_{UPint}$ and the security key $K_{UPenc}$ of the user plane) are generated between the UE and the gateway node, and the end-to-end control plane access stratum security keys (namely, the integrity key $K_{RRCint}$ and the security key $K_{RRCenc}$ of the control plane) are generated between the UE and the MNB. The end-to-end user plane access stratum security procedure may be performed independently between the UE and the gateway node, and the end-to-end control plane access stratum security procedure may be performed independently between the UE and the MNB.

For the scenario having two connections shown in FIG. 8, the user plane performs the end-to-end access stratum security between the UE and the gateway node in the micro communication path of the UE, and the control plane performs the end-to-end access stratum security between the UE and the macro base station in the macro communication path of the UE, thereby achieving flexible and independent key updating processes of the user plane and the control plane. For example, when the PDCP COUNT of a certain radio bear (RB) of the user plane in the micro communication path rolls over and needs to be restarted to count, it is achieved that the user plane keys are updated while the control plane keys are kept unchanged. With reference to FIG. 16, the MME generates two AS root keys (i.e., the user plane security root key $K_{eNB-U}$ and the control plane security root key $K_{eNB-C}$) during the NAS security process in step 1601, and transmits the generated user plane security root key $K_{eNB-U}$ and the control plane security root key $K_{eNB-C}$ to the MNB in step 1602. Afterwards, in steps 1603, 1604-1 and 1606 in FIG. 16, each of the MNB, the SRAN-node 3 and the UE generates the user plane security key $K_{UPint}$ and the user plane integrity key $K_{UPenc}$ based on $K_{eNB-U}$, and generates the control plane security key $K_{RRCint}$ and the control plane integrity key $K_{RRCenc}$ based on the $K_{eNB-C}$. Based on this, when the gateway node (for example, the SRAN-node 3) needs to initiate an independent user plane access stratum security key updating, for the method in FIG. 16, the updating is implemented in step 1604-1. The specific updating process may be as follow. The gateway node (such as the SRAN-node 3) generates a new $K_{eNB-U^{}}$ based on the $K_{eNB-U}$ and EARFCN-DL and PCI of the cell of the gateway node, and then the gateway node (such as the SRAN-node 3) generates new user plane access stratum security keys based on the $K_{eNB-U^{}}$ using the method in step 1604-1 in FIG. 16. Meanwhile, after the gateway node generates the $K_{eNB-U^{}}$, the gateway node informs the MNB of the $K_{eNB-U^{}}$. After the MNB receives the $K_{eNB-U^{}}$, the MNB informs the UE of the $K_{eNB-U^{}}$ in step 1605. The UE generates new user plane access stratum security keys based on the $K_{eNB-U^{**}}$ in step 1606.

From the above description with reference to the scenario shown in FIG. 8, the UE in dual-connection scenario has two connections, i.e., the macro communication path and the micro communication path. The user plane performs the end-to-end access stratum security between the UE and the gateway node in the micro communication path of the UE, and the control plane performs the end-to-end access stratum security between the UE and the macro base station in the macro communication path of the UE. Through the method for implementing access stratum security based on the application scenario shown in FIG. 8 according to embodiments of the present disclosure, on the one hand, no matter how many air interfaces are in the communication path of the UE (that is, no matter how many intermediate routing nodes are in the communication path of the UE), the user plane security is only performed between the UE and the gateway node through the end-to-end manner, which greatly ensures user plane security and avoids the safe leakage risk due to multiple air interfaces (namely multiple intermediate routing nodes). Since the control plane security is only performed between the UE and the macro base station through the end-to-end manner, the delay in control plane security procedure is reduced while ensuring the control plane security. On the other hand, the user plane security is only performed between the UE and the gateway node through the end-to-end manner Therefore, when the UE moves between different SRAN-nodes, as long as the communication paths of the UE are finally connected to the core network through the same node, the user plane security is not changed, thereby improving the mobility performance of the UE. In addition, since the user plane security is only performed between the UE and the gateway node through the end-to-end manner, the user plane security will not be changed no matter how the intermediate nodes in the communication path of the UE are changed, thereby ensuring the transmission continuity of user plane data of the UE.

In the future ultra-dense network shown in FIG. 3, only a few small nodes can be connected to the core network through wired network ports, and more small nodes are connected to the core network only by being connected to the small nodes having the wired network port trough one-hop or multi-hop radio backhaul links. How to ensure the legality of these small nodes and the security of these small nodes to access the network is also a problem that needs to be considered in future ultra-dense networks.

Figure 17:
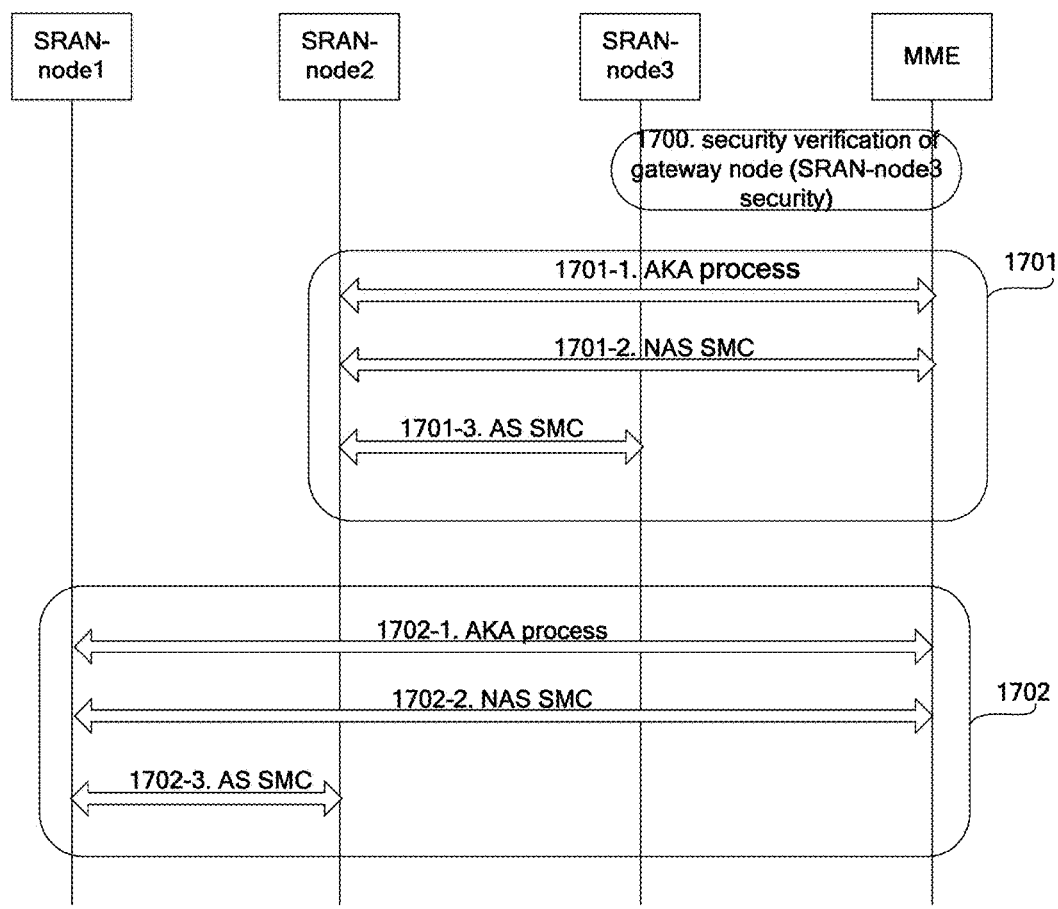
FIG. 17 is a flowchart of implementing node security verification level by level according to an embodiment of the present disclosure.

Each small node in embodiments of the present disclosure has its own Universal Integrated Circuit Card (UICC), and a secure channel between the node and the UICC interface is established between the small node and its UICC. Through this secure channel, a bi-directional authentication between small nodes and network ensures the validity of small nodes. In order to ensure the security of the small node accessing the network, FIG. 17 illustrates the level-by-level node security verification process. Still taking the small nodes in the communication path of the UE shown in FIG. 7 as an example, the intermediate routing node (e.g., the SRAN-node 2) is connected to the gateway node (e.g., the SRAN-node 3), and the initial access node (e.g., SRAN-node 1) is connected to the SRAN-node 2. The level-by-level node security verification refers to that the network performs the security verifications of the gateway node, the intermediate routing node and the initial access node successively. FIG. 17 is a flowchart of an embodiment of implementing level-by-level security verification according to an embodiment of the present disclosure. As shown in FIG. 17, the above process includes the following steps.

In step 1700, the security verification of the gateway node (e.g., SRAN-node 3) is performed.

Since there is a wired connection between the gateway node and the core network, the security authentication of the gateway node can be verified through a wired interface in the IP security manner and the like. The specific implementation is well known to those skilled in the art and is not intended to limit the protection scope of the present disclosure, and details are not described herein.

In step 1701, the security verification of the intermediate routing node (e.g., the SRAN-node 2) is performed.

Similar to the UE, in the communication path shown in FIG. 7, for the intermediate routing node (e.g., the SRAN-node 2), the gateway node (e.g., the SRAN-node 3) serves as the base station (eNB) accessed by the SRAN-node 2. For the gateway node (e.g., the SRAN-node 3), the intermediate routing node (e.g., the SRAN-node 2) servers as the UE which accesses the gateway node. Therefore, for the security verification of the intermediate routing node, the UE security verification method in the related LTE technology shown in FIG. 4 is adopted, and only three procedures including the AKA procedure in step 1701-1, the NAS SMC in 1701-2 and the AS SMC in 1701-3 need to be performed, which are specifically described below.

The intermediate routing node, as a small node, has its UICC, and a security root key K is stored on the USIM of the UICC. At the same time, the same security root key K is saved in the HSS on the network side. By adopting the method shown in FIG. 4 with this root key, the security authentication between the MME and the SRAN-node 2 may be implemented, and then the NAS SMC process is performed between the MME and the SRAN-node 2, and the AS SMC process is performed between the SRAN-node 2 and the gateway node (e.g., the SRAN-node 3).

Through the above procedure in step 1701, on the Ub2 interface between the SRAN-node 2 and the SRAN-node 3, Ub interface access stratum control plane security keys (that is, K-Ub2$_{RRCint}$ and K-Ub2$_{RRCenc}$) and user plane security keys (that is, K-Ub2$_{UPint}$ and K-Ub2$_{UPenc}$) for protecting the security of information transmission on the Ub2 interface between the two nodes may be generated.

In step 1702, the security verification of the initial access node is performed.

As in step 1701, similar to the UE, in the communication path shown in FIG. 7, for the initial access node (e.g., the SRAN-node 1), the intermediate routing node (e.g., the SRAN-node 2) is the base station (eNB) accessed by the SRAN-node1. However, for the intermediate routing node (e.g., the SRAN-node 2), the initial access node SRAN-node 1 is a UE accessing the intermediate routing node. Therefore, for the security verification of the initial access node, the UE security verification method in the related LTE art shown in FIG. 4 is adopted, only three procedures including the AKA process in step 1702-1, the NAS SMC in step 1702-2 and the AS SMC in step 1702-3 need to be performed, which are specifically described below.

The initial access node as a small node has its UICC. A security root key K is stored on the USIM of the UICC. At the same time, the same security root key K is saved in the HSS on the network side accordingly. By adopting the method shown in FIG. 4 with this root key, the security authentication between the MME and the SRAN-node 1 may be implemented, and then the NAS SMC process is performed between the MME and the SRAN-node 1, and the AS SMC process is performed between the SRAN-node 1 and the intermediate routing node (e.g., the SRAN-node 2).

Through the above procedure in step 1702, on the Ub1 interface between the SRAN-node 1 and the SRAN-node 2, Ub interface access stratum control plane security keys (that is, K-Ub1$_{RRCint}$ and K-Ub1$_{RRCenc}$) and user plane security keys (that is, K-Ub1$_{UPint}$ and K-Ub1$_{UPenc}$) for protecting the security of information transmission on the Ub1 interface between the two nodes may be generated.

In order to further improve the security of the access stratum control plane and the access stratum user plane of the UE of embodiments of the present disclosure, on the basis of the level-by-level node security verification shown in FIG. 17, when being transmitted through the SRAN-node 2 or SRAN-node 1, access stratum security related messages of embodiments of the present disclosure, such as the E2E access stratum security mode command in step 1004 and the E2E access stratum security mode completeness in step 1006 shown in FIG. 10, the message in step 1203 and the message in step 1205 shown in FIG. 12, and the message in step 1304 shown in FIG. 13, may be respectively encrypted and integrity protected using the Ub interface access stratum control plane security keys of the Ub1 interface and Ub2 interface.

Figure 18:
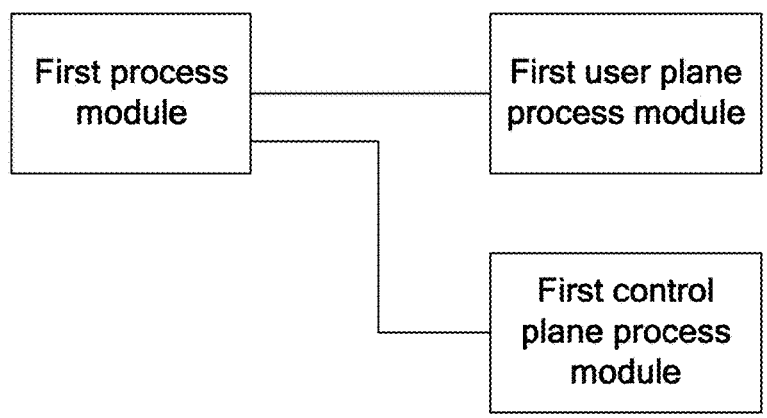
FIG. 18 is a schematic structural diagram of a user equipment according to an embodiment of the present disclosure.

FIG. 18 is a schematic structural diagram of a user equipment according to an embodiment of the present disclosure. As shown in FIG. 18, the UE at least includes a first process module, a first user plane process module and a first control plane process module.

The first process module is configured to implement an authentication and key agreement (AKA) process and a NAS security process between the UE and a core network.

The first user plane process module is configured to perform end-to-end user plane access stratum security process between the UE and a gateway node.

The first control plane process module is configured to: perform end-to-end control plane access stratum security between the UE and an initial access node when the UE only has a micro communication path; or perform end-to-end control plane access stratum security between the UE and a macro base station in a macro communication path when the UE has the micro communication path and the macro communication path.

The micro communication path is a communication path in which the UE accesses a small radio access node via a radio access link and then accesses the core network finally. The macro communication path is a communication path in which the UE accesses the macro base station via the radio access link and then accesses the core network finally.

The first user plane process module is further configured to perform end-to-end user plane encryption and user plane integrity protection between the UE and the gateway node.

The first control plane process module is further configured to perform end-to-end control plane encryption and control plane integrity protection between the UE and the initial access node or between the UE and the macro base station.

In the micro communication path of the UE, the UE communicates with the core network through at least two radio air interfaces. The micro communication path at least includes the UE, the initial access node and the gateway node.

When the UE communicates with the core network through more than two radio air interfaces, the micro communication path further comprises at least one intermediate routing node.

The initial access node is the small radio access node accessed by the UE through the radio access link.

The gateway node is the small radio access node capable of accessing the core network through a wired interface.

The intermediate routing node is the small radio access node for providing relay transmission, so as to realize the communication between the initial access node and the gateway node and finally realize the communication between the UE accessing the initial access node and the core network.

The first user plane process module is further configured to perform the end-to-end user plane access stratum security between the UE and the gateway node between a packet data convergence protocol security (PDCP-s) layer of the UE and the PDCP-s layer of the gateway node.

Specifically, the user plane data of upper layers of the UE is subjected to encryption and integrity protection in the PDCP-s layer of the UE before being transmitted to the air interface, and the user plane data will subjected to decryption and integrity verification in the PDCP-s layer of the gateway node by the gateway node after the user plane data is transmitted to the gateway node. The gateway node acquires the user plane data to be transmitted to the UE from the core network. The user plane data to be transmitted to the UE is subjected to encryption and integrity protection in the PDCP-s layer of the gateway node before being transmitted to the air interface, and the user plane data will subjected to decryption and integrity verification by the UE in the PDCP-s layer of the UE after the user plane data is transmitted to the UE.

The first control plane process module is configured to perform the end-to-end control plane access stratum security between the UE and the initial access node between the PDCP layer of the UE and the PDCP layer of the initial access node; or perform the end-to-end control plane access stratum security between the UE and the macro base station between the PDCP layer of the UE and the PDCP layer of the macro base station.

Specifically, the uplink RRC signaling of the UE is subjected to encryption and integrity protection in the PDCP layer of the UE before being transmitted to the air interface, and the initial access node or the macro base station performs decryption and integrity verification on the uplink RRC signaling after receiving the uplink RRC signaling. The downlink RRC signaling transmitted to the UE by the initial access node or the macro base station is subjected to encryption and integrity protection in the PDCP layer of the initial access node or the macro base station before being transmitted to the air interface, and the UE performs decryption and integrity verification on the downlink RRC signaling after receiving the downlink RRC signaling.

Figure 19:
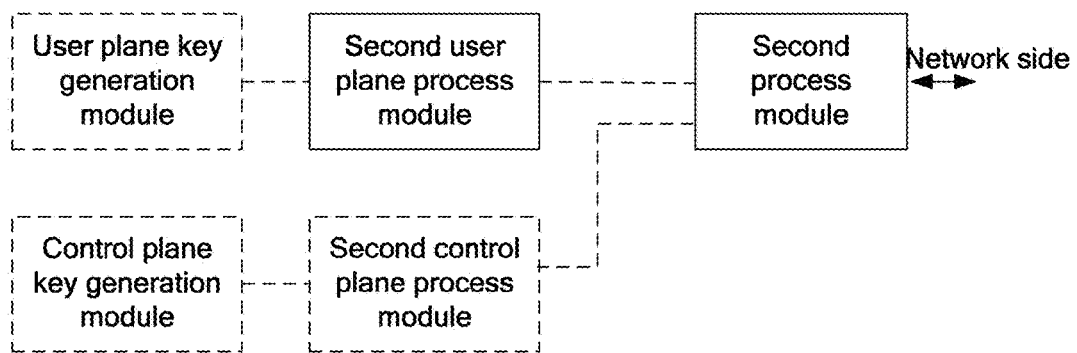
FIG. 19 is a schematic structural diagram of a small radio access node according to an embodiment of the present disclosure.

FIG. 19 is a schematic structural diagram of a small radio access node according to an embodiment of the present disclosure. This small radio access node is capable of accessing a core network through a wired interface.

As shown in FIG. 19, the small radio access node at least includes a second user plane process module, configured to perform end-to-end user plane access stratum security between a UE and the small radio access node. The end-to-end user plane access stratum security includes end-to-end user plane encryption and user plane integrity protection.

When the UE communicates with the core network through two radio air interfaces, the small radio access node communicates with an initial access node through a radio backhaul interface.

When the UE communicates with the core network through more than two radio air interfaces, the small radio access node communicates with an intermediate routing node through the radio backhaul interface, and the intermediate routing node communicates with the initial access node through the radio backhaul interface. When there are two or more intermediate routing nodes, the intermediate routing nodes communicate with each other through the radio backhaul interface.

The initial access node is the small radio access node accessed by the UE through the radio access link. The intermediate routing node is the small radio access node for providing relay transmission, so as to realize the communication between the initial access node and the gateway node and finally realize the communication between the UE accessing the initial access node and the core network.

The end-to-end user plane access stratum security is performed between the PDCP-s layer of the small radio access node and the PDCP-s layer of the UE.

The second user plane process module is configured to: perform, in the PDCP-s layer of the small radio access node, decryption and integrity verification on user plane data transmitted from the UE and received through the air interface; and acquire user plane data to be transmitted to the UE from the core network, and before the user plane data to be transmitted to the UE is transmitted to the air interface, perform, in the PDCP-s layer of the small radio access node, encryption and integrity protection on the user plane data to be transmitted to the UE.

The small radio access node further includes a user plane key generation module configured to: generate a user plane encryption key $K_{UPenc}$ and a user plane integrity protection key $K_{UPint}$ required for performing the end-to-end user plane encryption and user plane integrity protection, before the second user plane process module performs the end-to-end user plane encryption and user plane integrity protection between the UE and the small radio access node.

The user plane key generation module is configured to: generate the user plane encryption key $K_{UPenc}$ and the user plane integrity protection key $K_{UPint}$ based on an access stratum security root key $K_{eNB}$; or receive the user plane encryption key $K_{UPenc}$ and the user plane integrity protection key $K_{UPint}$ from a macro base station. The $K_{eNB}$ is transmitted to the small radio access node by the core network or the macro base station. The macro base station is another base station accessed by the UE through the radio access link besides the initial access node.

The small radio access node is accessed by the UE through the radio access link. As shown in FIG. 19, the small radio access node at least includes a second control plane process module. The second control plane process module is configured to perform end-to-end control plane access stratum security between the UE and the small radio access node, where the end-to-end control plane access stratum security includes end-to-end control plane encryption and control plane integrity protection.

The end-to-end control plane access stratum security is performed between a packet data convergence protocol (PDCP) layer of the small radio access node and the PDCP layer of the UE.

The second control plane process module is configured to: perform decryption and integrity verification on a RRC signaling after receiving the RRC signaling; and perform, in the PDCP layer of the small radio access node, encryption and integrity protection on a downlink RRC signaling to be transmitted to the UE, and then transmit the downlink RRC signaling to the air interface.

The small radio access node further includes a control plane key generation module configured to: generate a control plane encryption key $K_{RRCenc}$ and a control plane integrity protection key $K_{RRCint}$ required for performing the end-to-end control plane encryption and control plane integrity protection, before the second control plane process module performs the end-to-end control plane encryption and control plane integrity protection between the UE and the small radio access node.

The control plane key generation module is configured to: receive the control plane encryption key $K_{RRCenc}$ and the control plane integrity protection key $K_{RRCint}$ from a gateway node, or generate the control plane encryption key $K_{RRCenc}$ and the control plane integrity protection key $K_{RRCint}$ based on an access stratum control plane security root key $K_{eNB*}$ from the gateway node.

As shown in FIG. 19, the small radio access node of an embodiment of the present disclosure further includes a second process module configured to implement node security verification level by level. The level-by-level node security verification includes security verification to the small radio access node by network.

The second process module is further configured to perform encryption and integrity protection on messages related to access stratum security.

Further, an embodiment of the present disclosure further provides a user equipment UE. The UE includes a processor and a memory. The memory is configured to store processor-executable instructions. When being executed by the processor, the instructions are used for implementing the functions of the modules shown in FIG. 18.

Furthermore, an embodiment of the present disclosure further provides a small radio access node including a processor and a memory. The memory is configured to store processor-executable instructions. When being executed by the processor, the instructions are used for implementing the functions of the modules shown in FIG. 19.

Furthermore, an embodiment of the present disclosure further provides a computer readable storage medium storing computer executable instructions. When being executed, the computer executable instructions are used for performing the above method for implementing access stratum security.

Those skilled in the art may understand that all or part of the steps in the foregoing methods may be implemented by a program that instructing relevant hardware (for example, a processor), and the program may be stored in a computer-readable storage medium, such as a read-only memory, a magnetic disk, an optical disk. All or part of the steps of the above embodiments may also be implemented by one or more integrated circuits. Correspondingly, each module/unit in the above embodiments can be implemented in the form of hardware, for example, the corresponding function may be achieved by integrated circuits; or can be implemented in the form of software function module, for example, the corresponding function may be achieved by executing by the processor the program/instructions stored in a memory. This disclosure is not limited to any particular type of combination of hardware and software.

The above descriptions are merely preferred embodiments of the present disclosure and are not intended to limit the protection scope of the present disclosure. Any amendments, equivalent substitutions and improvements made within the spirit and principle of the present disclosure shall be included in the protection scope of the present disclosure.

INDUSTRIAL APPLICABILITY

According to a method for implementing access stratum security, a user equipment, and a small radio access node provided by embodiments of the present disclosure, the user plane security is ensured, the safe leakage risk due to multiple air interfaces (namely multiple intermediate routing nodes) is avoided. The delay in control plane security procedure is reduced while ensuring the control plane security. The mobile performance of the UE is increased, and the transmission continuity of user plane data of the UE is ensured.

What is claimed is:

1. A method for implementing access stratum security, comprising:
   performing end-to-end user plane access stratum security between a user equipment (UE) and a gateway node;
   performing end-to-end control plane access stratum security between the UE and an initial access node in response to determining that the UE only has a micro communication path; and
   in response to determining that the UE has the micro communication path and a macro communication path, performing the end-to-end control plane access stratum security between the UE and a macro base station in the macro communication path;
   wherein the micro communication path includes a communication path in which the UE accesses a small radio access node via a radio access link and then accesses a core network finally; and the macro communication path includes a communication path in which the UE accesses the macro base station via the radio access link and then accesses the core network finally,
   wherein:
   performing end-to-end user plane access stratum security between a user equipment (UE) and a gateway node comprises: performing end-to-end user plane encryption and user plane integrity protection between the UE and the gateway node;
   performing end-to-end control plane access stratum security between the UE and an initial access node comprises performing end-to-end control plane encryption and control plane integrity protection between the UE and the initial access node, and
   performing end-to-end control plane access stratum security between the UE and a macro base station comprises performing the end-to-end control plane encryption and control plane integrity protection between the UE and the macro base station,
   wherein the method is performed by at least one processor.

2. The method according to claim 1, wherein:
   in the micro communication path, the UE communicates with the core network through at least two radio air interfaces;
   the micro communication path at least comprises the UE, the initial access node and the gateway node; and
   in response to determining that the UE communicates with a core network through more than two radio air interfaces, the micro communication path further comprises at least one intermediate routing node.

3. The method according to claim 2, further comprising:
   using a radio access air interface between the UE and the initial access node; and
   using a radio backhaul interface Ub between the initial access node and the gateway node.

4. The method according to claim 2, further comprising:
   using a radio backhaul interface Ub not only between the intermediate routing node and the initial access node but also between the intermediate routing node and the gateway node; and
   in response to determining that there are two or more intermediate routing nodes, using the radio backhaul interface Ub between the intermediate routing nodes.

5. The method according to claim 2, wherein:
   the initial access node includes the small radio access node accessed by the UE through the radio access link;
   the gateway node includes the small radio access node capable of accessing the core network through a wired interface; and
   the intermediate routing node includes the small radio access node for providing relay transmission, so as to realize the communication between the initial access node and the gateway node and realize the communication between the UE accessing the initial access node and the core network.

6. The method according to claim 1, wherein performing end-to-end user plane access stratum security between a user equipment (UE) and a gateway node comprises:

performing the end-to-end user plane access stratum security between a packet data convergence protocol security (PDCP-s) layer of the UE and the PDCP-s layer of the gateway node.

7. The method according to claim 6, wherein:
the gateway node, at a side of a radio backhaul interface Ub, and the UE comprise the following layers from bottom to top respectively: a physical layer L1, a media access control (MAC) layer, a radio link control (RLC) layer, a packet data convergence protocol thinned (PDCP-t) layer and the packet data convergence protocol security (PDCP-s) layer; and each of the initial access node and an intermediate routing node comprises the following layers from bottom to top: L1, MAC and RLC, or comprises following layers from bottom to top: L1, MAC, RLC and PDCP-t;

wherein the PDCP-s and the PDCP-t of the UE form a PDCP layer in response to being incorporated into one protocol layer;

the PDCP-s and the PDCP-t of the gateway node form the PDCP layer in response to being incorporated into one protocol layer.

8. The method according to claim 6, wherein performing end-to-end user plane encryption and user plane integrity protection between the UE and the gateway node comprises:
performing, in the PDCP-s of the UE, encryption and integrity protection on user plane data of upper layers of the UE before the user plane data is transmitted to an air interface, and performing, in the PDCP-s of the gateway node, decryption and integrity verification on the user plane data by the gateway node after the user plane data is transmitted to the gateway node; and in response to determining that the user plane data required to be transmitted to the UE is obtained from the core network by the gateway node, performing, in the PDCP-s of the gateway node, encryption and integrity protection on the user plane data required to be transmitted to the UE before the user plane data required to be transmitted to the UE is transmitted to the air interface; and performing, in the PDCP-s of the UE, decryption and integrity verification on the user plane data by the UE, after the user plane data is transmitted to the UE.

9. The method according to claim 6, wherein the PDCP-s is configured to implement: header compression and decompression, and secure operations, wherein the secure operations comprise: encryption, decryption, integrity protection and integrity verification.

10. The method according to claim 1, wherein performing end-to-end control plane access stratum security between the UE and the initial access node comprises performing the end-to-end control plane access stratum security between a packet data convergence protocol (PDCP) layer of the UE and the PDCP of the initial access node, and
performing end-to-end control plane access stratum security between the UE and a macro base station comprises performing the end-to-end control plane access stratum security between the PDCP of the UE and the PDCP of the macro base station.

11. The method according to claim 10, wherein:
the initial access node, at a side of a radio access air interface Uu, and the UE comprise the following layers from bottom to top respectively: a physical layer L1, a media access control (MAC) layer, a radio link control (RLC) layer and a packet data convergence protocol (PDCP) layer;

at a side of an Ub interface, each of the initial access node, an intermediate routing node and the gateway node comprises the following layers from bottom to top: L1, MAC and RLC, or comprises L1, MAC, RLC and a packet data convergence protocol thinned (PDCP-t) layer.

12. The method according to claim 10, wherein performing end-to-end control plane encryption and control plane integrity protection between the UE and the initial access node or between the UE and the macro base station comprises:
performing, in the PDCP layer of the UE, encryption and integrity protection on a uplink radio resource control layer (RRC) signaling of the UE before the uplink RRC signaling is transmitted to an air interface; and performing decryption and integrity verification on the uplink RRC signaling by the initial access node or the macro base station after the RRC signaling is received; and before a downlink RRC signaling to be transmitted to the UE from the initial access node or the macro base station is transmitted to the air interface, performing, by the initial access node or the macro base station, encryption and integrity protection on the downlink RRC signaling in the PDCP of the initial access node or the macro base station; and performing decryption and integrity verification on the downlink RRC signaling by the UE after the downlink RRC signaling is received.

13. The method according to claim 1, further comprising:
generating, between the UE and the gateway node, a user plane encryption key KUPenc and a user plane integrity protection key KUPint required for performing the end-to-end user plane encryption and user plane integrity protection between the UE and the gateway node;

wherein in response to determining that the UE only has the micro communication path, generating, between the UE and the gateway node, a user plane encryption key KUPenc and a user plane integrity protection key KUPint required for performing the end-to-end user plane encryption and user plane integrity protection between the UE and the gateway node comprises:
generating, by the UE and the gateway node, the user plane encryption key KUPenc and the user plane integrity protection key KUPint based on an access stratum security root key KeNB;

wherein the KeNB of the UE is generated after performing an authentication and key agreement (AKA) process and a non-access stratum (NAS) security process between the UE and the core network; the KeNB of the gateway node is received from the core network after performing the AKA process and the NAS security process between the UE and the core network;

wherein in response to determining that the UE has the micro communication path and the macro communication path, generating, between the UE and the gateway node, a user plane encryption key KUPenc and a user plane integrity protection key KU Pint required for performing the end-to-end user plane encryption and user plane integrity protection between the UE and the gateway node comprises:
generating, by the UE and the macro base station in the macro communication path, the user plane encryption key KUPenc and the user plane integrity protection key KUPint based on the KeNB; and transmitting, by the macro base station, the generated user plane encryption key KUPenc and the user plane integrity protection key KUPint to the gateway node; or generating, by the UE and the gateway node, the user plane encryption key KUPenc and the user plane integrity protection key KUPint based on the KeNB, wherein the KeNB of the gateway node is received from the macro base station;

wherein the KeNB of the UE is generated after performing the authentication and key agreement (AKA) process and the non-access stratum (NAS) security process between the UE and the core network; the KeNB of the macro base station is received from the core network after performing the AKA process and the NAS security process between the UE and the core network.

14. The method according to claim 1, wherein the method further comprises the followings in response to determining that the UE only has the micro communication path: generating a control plane encryption key KRRCenc and a control plane integrity protection key KRRCint required for performing the end-to-end control plane encryption and control plane integrity protection between the UE and the initial access node, wherein generating a control plane encryption key KRRCenc and a control plane integrity protection key KRRCint required for performing the end-to-end control plane encryption and control plane integrity protection between the UE and the initial access node, comprises one of the following:

generating, by the UE and the gateway node, the control plane encryption key KRRCenc and the control plane integrity protection key KRRCint based on an access stratum security root key KeNB; and transmitting, by the gateway node, the generated control plane encryption key KRRCenc and control plane integrity protection key KRRCint to the initial access node; and generating, by the UE and the gateway node, an access stratum control plane security root key KeNB* based on the KeNB, a downlink E-UTRA Absolute Radio Frequency Channel Number (EARFCN-DL) of a cell of the initial access node and a physical cell identity (PCI), transmitting the generated KeNB* by the gateway node to the initial access node, and generating, by the UE and the gateway node, the control plane encryption key KRRCenc and the control plane integrity protection key KRRCint based on the KeNB*;

wherein the method further comprises: in response to determining that the UE has the micro communication path and the macro communication path:

generating the control plane encryption key KRRCenc and the control plane integrity protection key KRRCint required for performing the end-to-end control plane encryption and control plane integrity protection between the UE and the macro base station, wherein generating the control plane encryption key KRRCenc and the control plane integrity protection key KRRCint required for performing the end-to-end control plane encryption and control plane integrity protection between the UE and the macro base station, comprises:

generating, by the UE and the macro base station, the control plane encryption key KRRCenc and the control plane integrity protection key KRRCint based on the access stratum security root key KeNB;

wherein the KeNB of the UE is generated after performing an authentication and key agreement (AKA) process and a non-access stratum (NAS) security process between the UE and the core network; the KeNB of the gateway node or the macro base station is received from the core network after performing the AKA process and the NAS security process between the UE and the core network.

15. The method according to claim 1, wherein keys of the user plane and keys of the control plane are individually updated respectively.

16. A non-transitory computer readable storage medium storing computer executable instructions that, when executed by a processor, cause the processor to perform the method according to claim 1.

17. A user equipment (UE), comprising: a first processor, a first user plane processor and a first control plane processor, wherein:

the first processor is configured to implement an authentication and key agreement (AKA) process and a non-access stratum (NAS) security process between the UE and a core network;

the first user plane processor is configured to perform end-to-end user plane access stratum security between the UE and a gateway node; and the first control plane processor is configured to: perform end-to-end control plane access stratum security between the UE and an initial access node in response to determining that the UE only has a micro communication path;

perform the end-to-end control plane access stratum security between the UE and a macro base station in a macro communication path in response to determining that the UE has the micro communication path and the macro communication path;

wherein the micro communication path includes a communication path in which the UE accesses a small radio access node via a radio access link and then accesses the core network; and the macro communication path includes a communication path in which the UE accesses the macro base station via the radio access link and then accesses the core network, wherein:

performing end-to-end user plane access stratum security between a user equipment (UE) and a gateway node comprises: performing end-to-end user plane encryption and user plane integrity protection between the UE and the gateway node;

performing end-to-end control plane access stratum security between the UE and an initial access node comprises performing end-to-end control plane encryption and control plane integrity protection between the UE and the initial access node, and performing end-to-end control plane access stratum security between the UE and a macro base station comprises performing the end-to-end control plane encryption and control plane integrity protection between the UE and the macro base station.

18. A small radio access node capable of accessing a core network through a wired interface, wherein the small radio access node at least comprises: a second user plane processor, configured to perform end-to-end user plane access stratum security between a UE and the small radio access node, wherein the end-to-end user plane access stratum security comprises end-to-end user plane encryption and user plane integrity protection;

wherein the small radio access node is accessed by the user equipment (UE) according to claim 17 through a radio access link, and the small radio access node further comprises: a second control plane processor, configured to perform end-to-end control plane access stratum security between the UE and the small radio access node, wherein the end-to-end control plane access stratum security comprises end-to-end control plane encryption and control plane integrity protection.

\* \* \* \* \*